United States Patent
Saito et al.

(10) Patent No.: US 7,695,865 B2
(45) Date of Patent: Apr. 13, 2010

(54) METHOD OF MANUFACTURING A SOLID ELECTROLYTE BATTERY HAVING PARTICLE INK LAYERS

(75) Inventors: Takamitsu Saito, Yokohama (JP); Hideaki Horie, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 963 days.

(21) Appl. No.: 11/015,037

(22) Filed: Dec. 20, 2004

(65) Prior Publication Data

US 2005/0132562 A1  Jun. 23, 2005

(30) Foreign Application Priority Data

Dec. 22, 2003  (JP)  ............ P 2003-425013

(51) Int. Cl.
*H01M 4/60* (2006.01)
*H01M 4/02* (2006.01)
*H01M 6/14* (2006.01)

(52) U.S. Cl. .................. 429/212; 429/215; 429/209; 429/300

(58) Field of Classification Search ............. 429/303, 429/217, 128, 231.1
See application file for complete search history.

(56) References Cited

U.S. PATENT DOCUMENTS 6,372,387 B1 * 4/2002 Kawakami et al. .......... 429/303

2001/0044045 A1 * 11/2001 Sato et al. ................. 429/217
2002/0042986 A1 *  4/2002 Sato et al. ................. 29/623.5
2003/0129494 A1 *  7/2003 Kaneda et al. ............ 429/231.1
2004/0041537 A1 *  3/2004 Ishida et al. ............... 320/107

FOREIGN PATENT DOCUMENTS

| JP | 09-204937 | 8/1997 |
| JP | 2000-123880 | 4/2000 |
| JP | 2002-260739 | 9/2002 |
| JP | 2002-305028 | 10/2002 |
| WO | WO 02/071529 A1 * | 9/2002 |

OTHER PUBLICATIONS

Japanese Office Action, with English translation, issued in Japanese Patent Application No. 2003-425013, mailed Sep. 8, 2009.

* cited by examiner

*Primary Examiner*—Dah-Wei D Yuan
*Assistant Examiner*—Zachary Best
(74) *Attorney, Agent, or Firm*—McDermott Will & Emery LLP

(57) ABSTRACT

A method of manufacturing a solid electrolyte battery includes a step of thermally pressing a composite layer including a positive electrode ink layer, an electrolyte ink layer and a negative electrode ink layer that are formed by coating a positive electrode ink, an electrolyte ink and a negative electrode ink. Further, the positive electrode ink, the electrolyte ink and the negative electrode ink contain a polymer electrolyte. By this method, it is possible to improve the flow of ions across respective interlayers of a positive electrode active material layer, a solid electrolyte layer and a negative electrode active material layer.

10 Claims, 12 Drawing Sheets

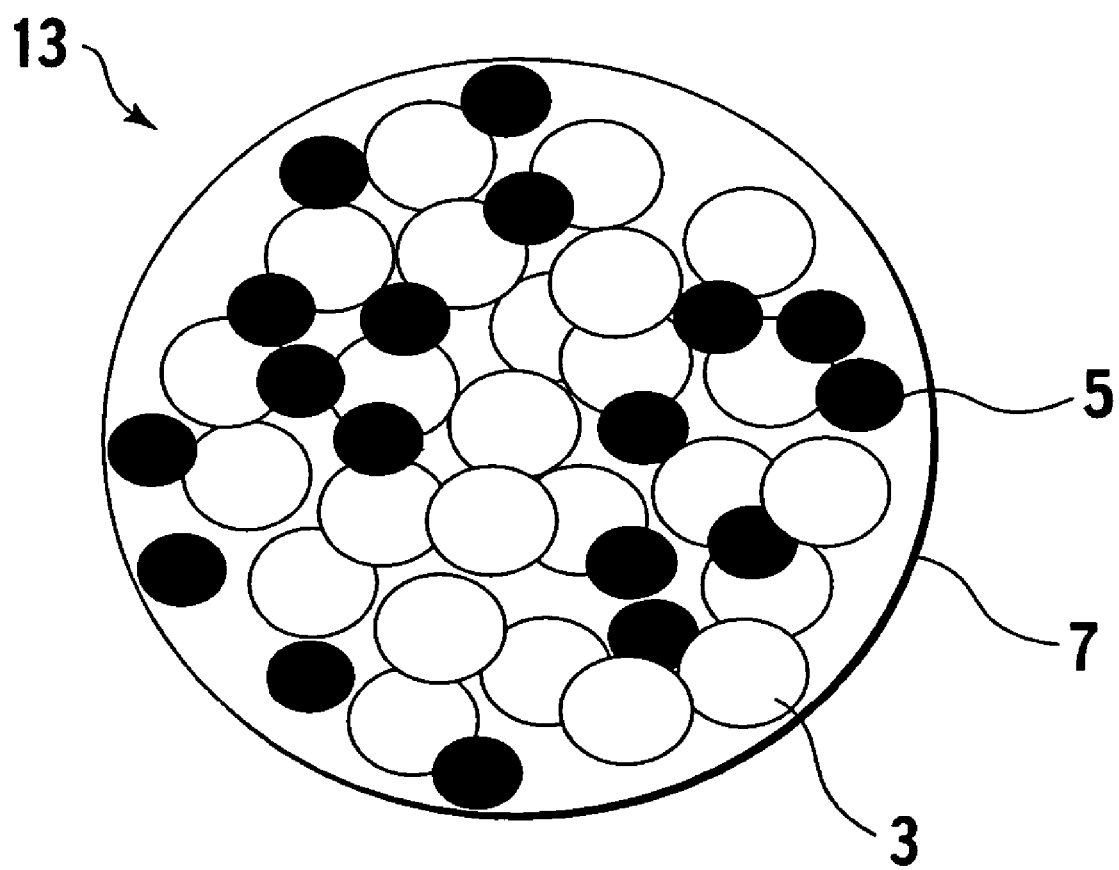

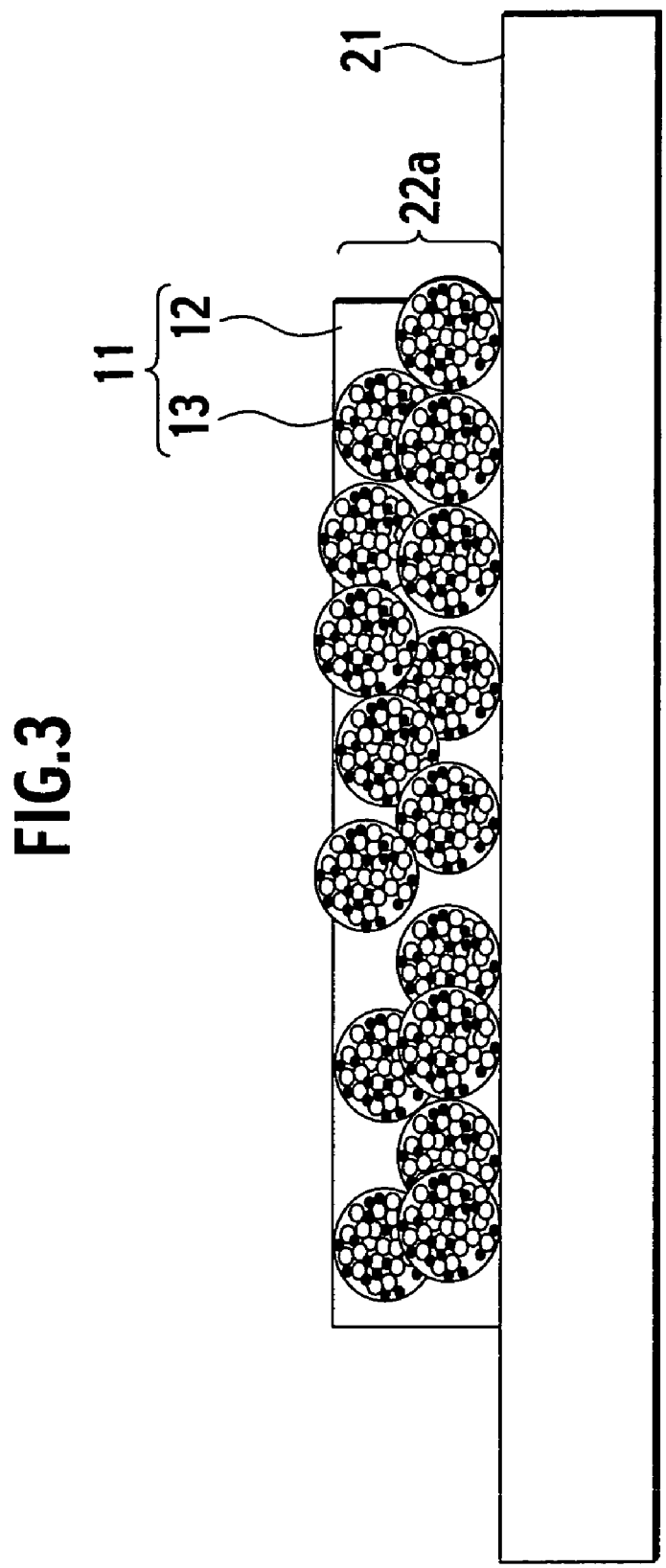

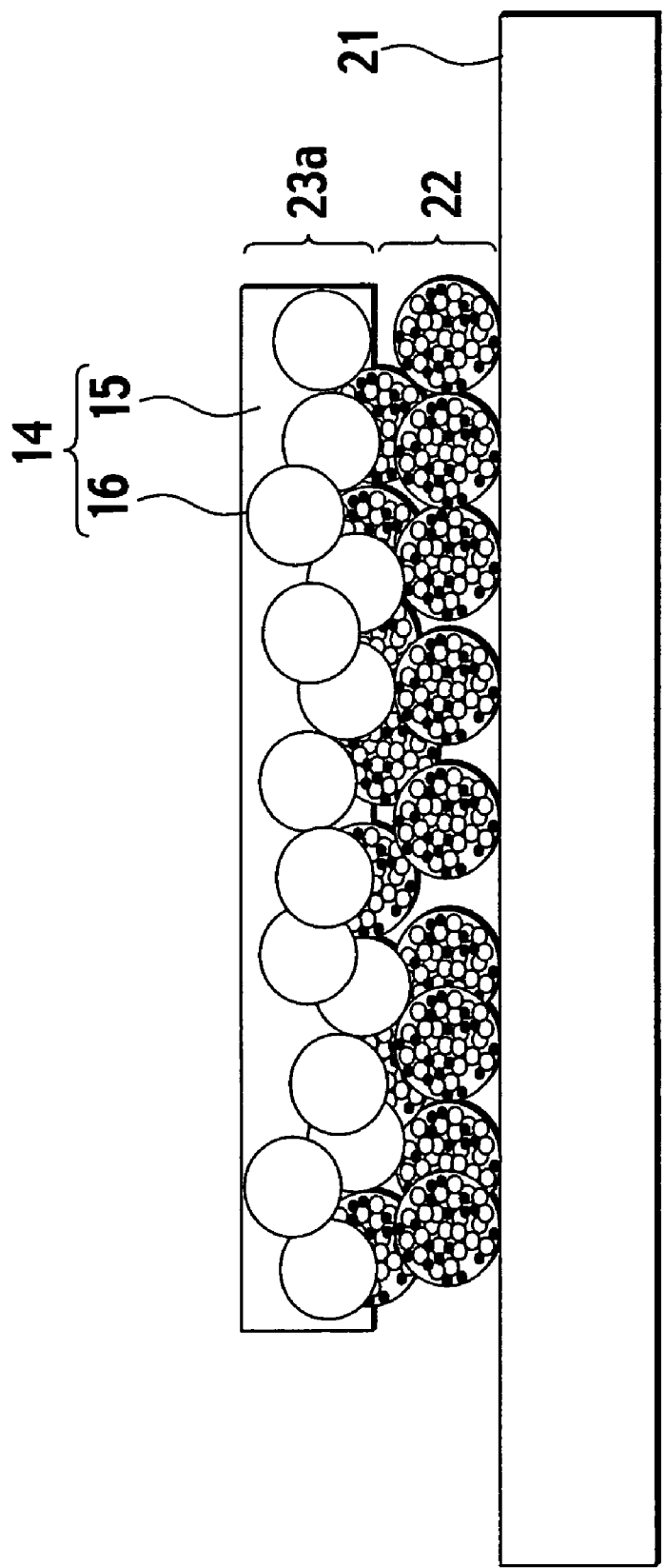

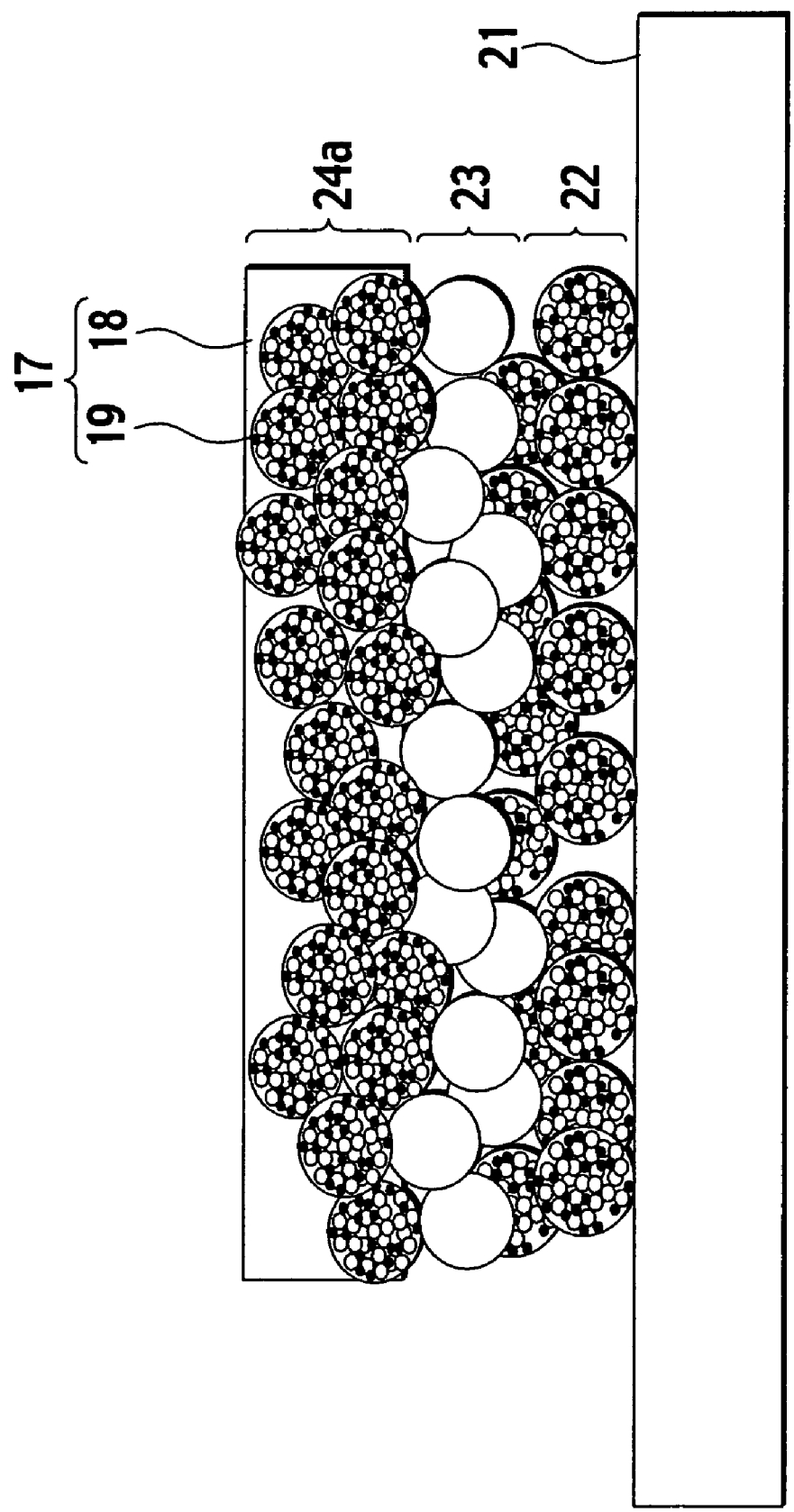

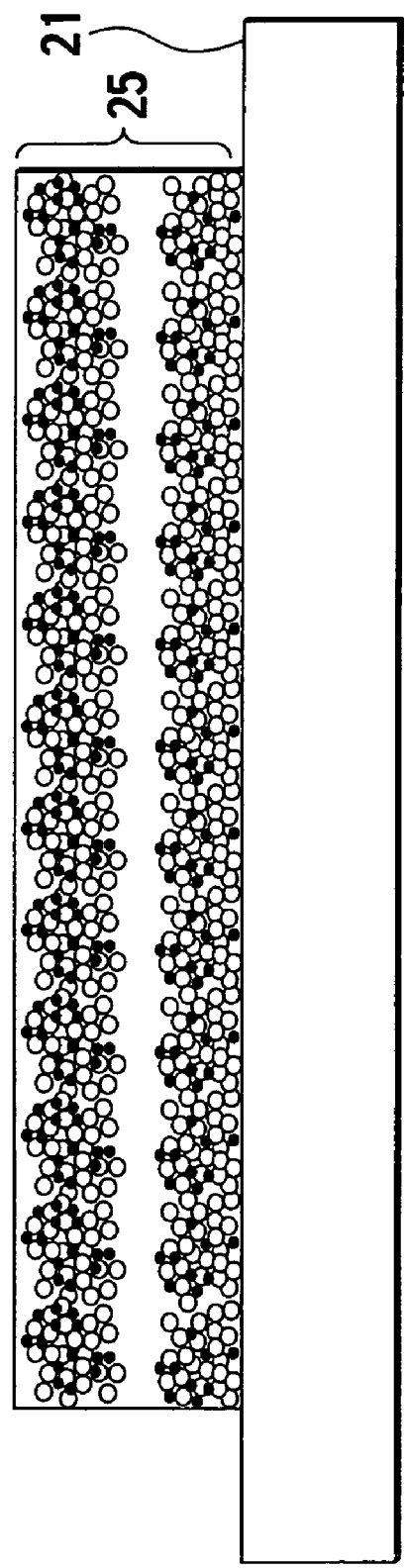

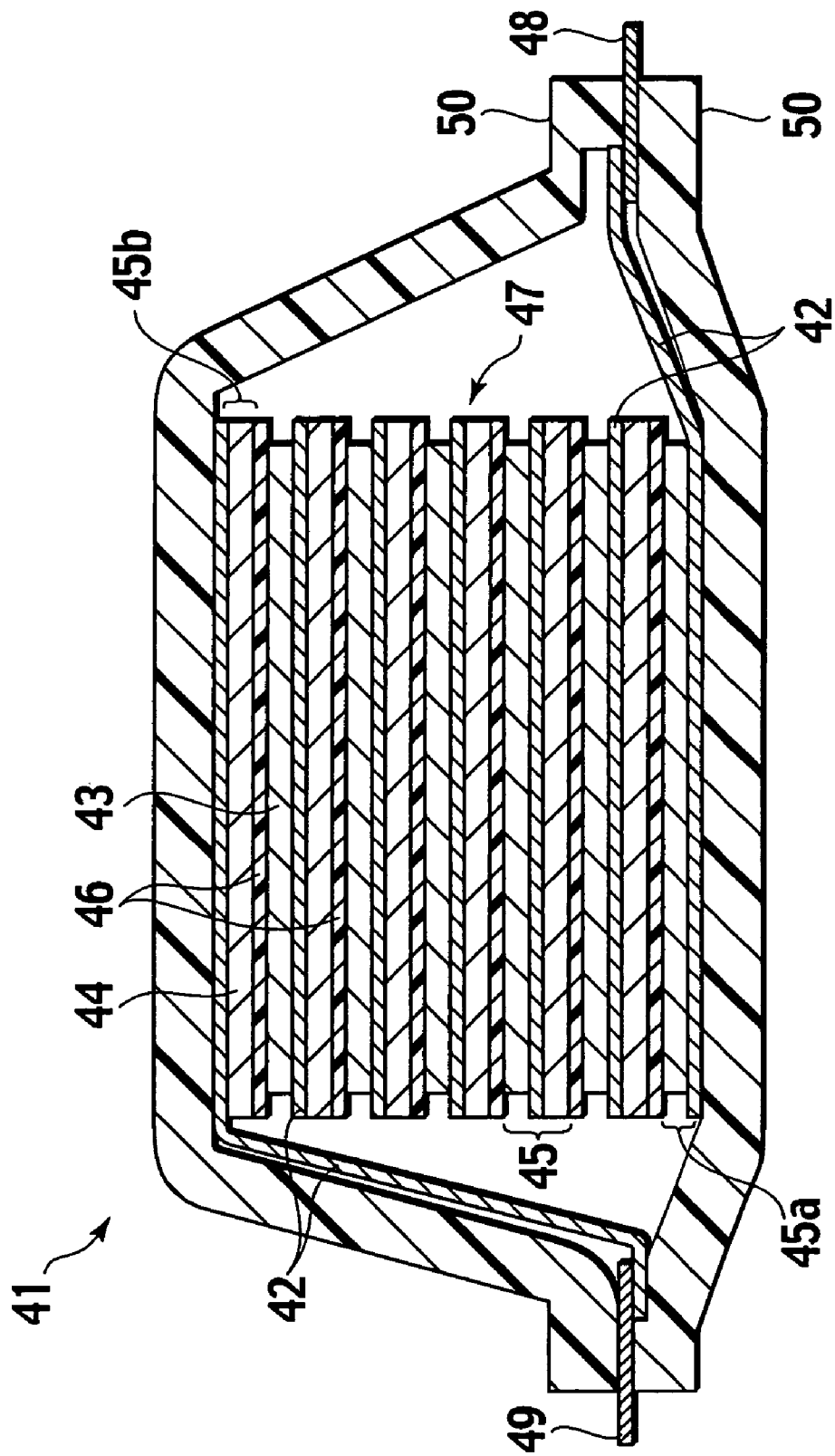

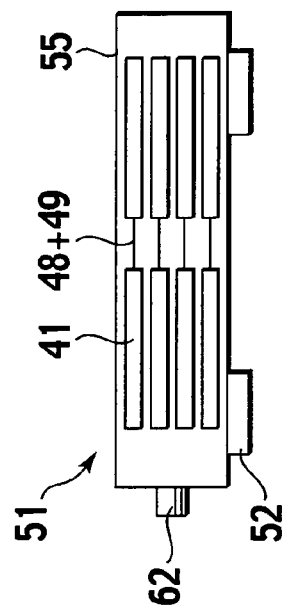
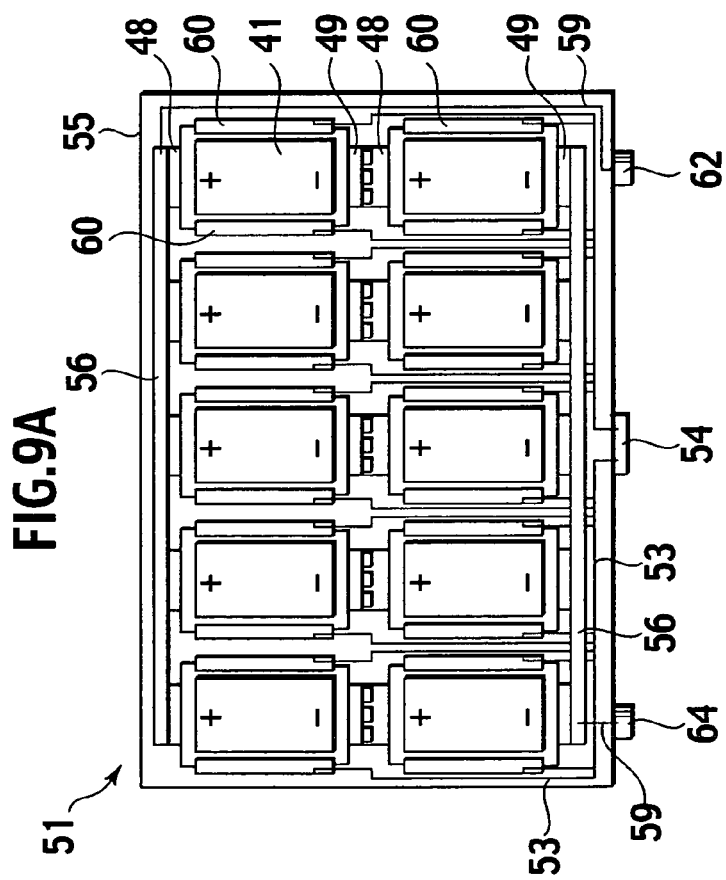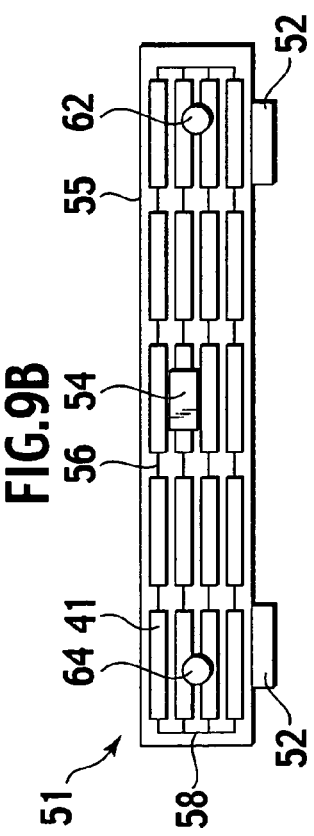

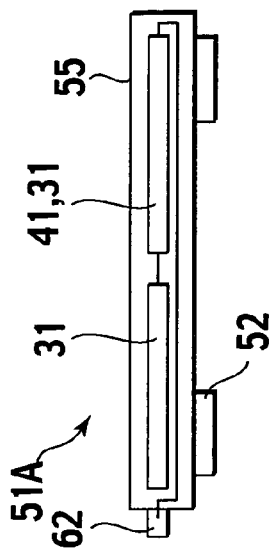
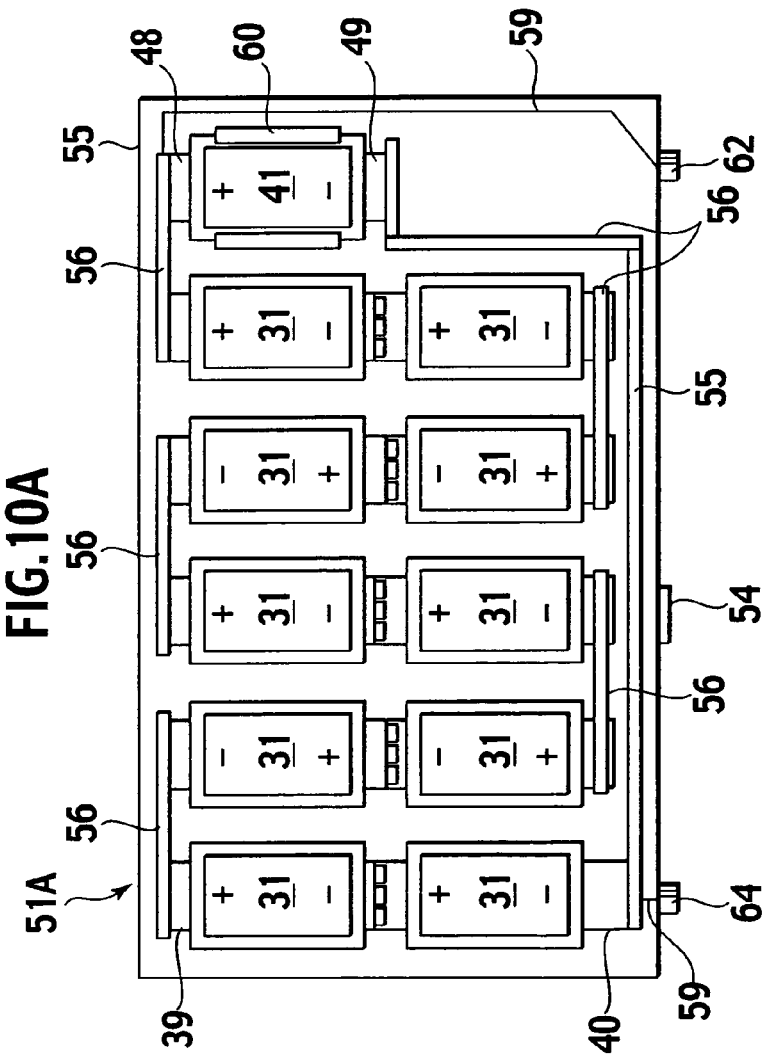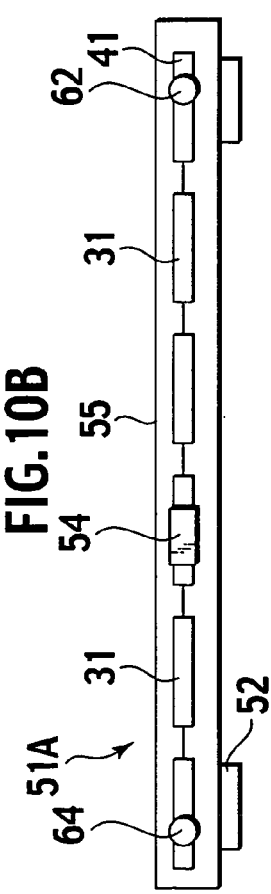

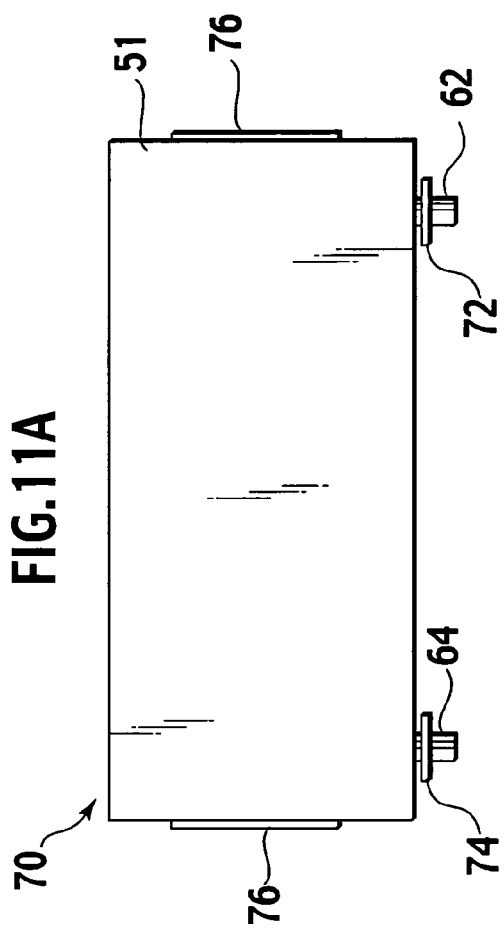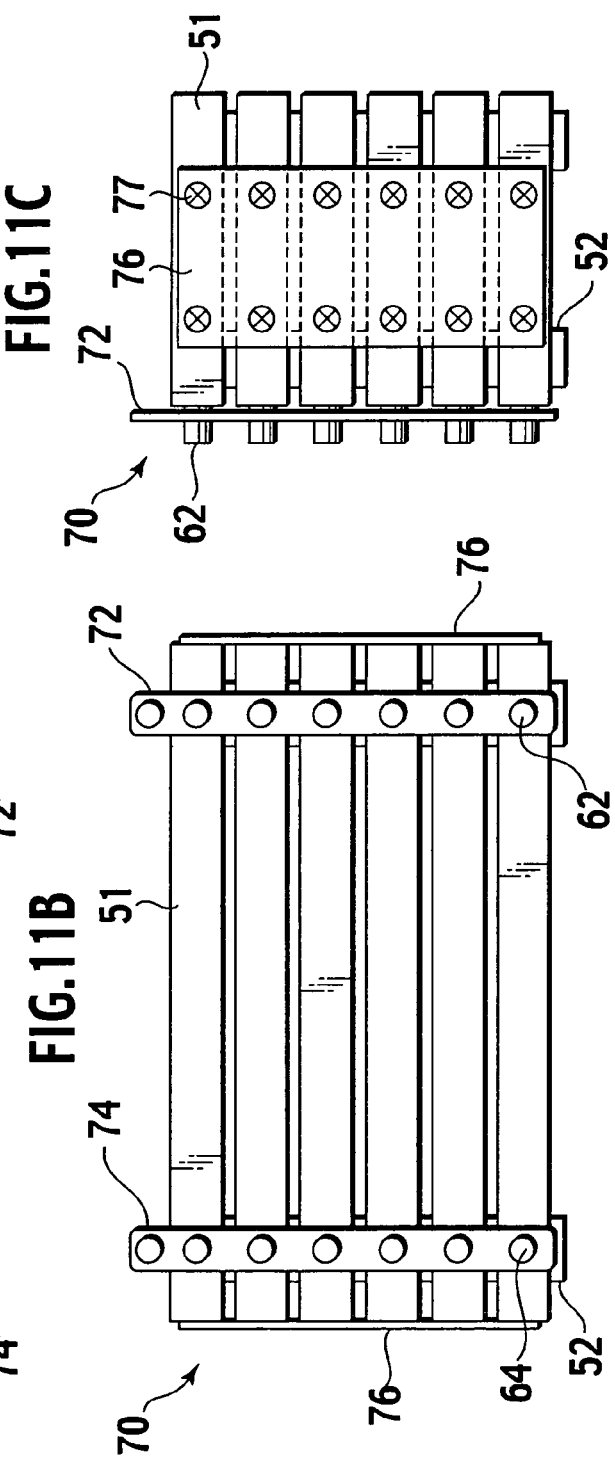

METHOD OF MANUFACTURING A SOLID ELECTROLYTE BATTERY HAVING PARTICLE INK LAYERS

BACKGROUND OF THE INVENTION

1. Field of the Invention

The present invention relates to a method of manufacturing a solid electrolyte battery and a solid electrolyte battery obtained by such a method.

2. Description of the Related Art

In recent years, research and development work has been undertaken to provide a motor drive power supply and an auxiliary power supply for a hybrid use in order to promote an electric vehicle (EV), a hybrid electric vehicle (HEV) and a fuel cell vehicle (FCV) against the background with an increasing concern for environmental protection movements. In such applications, a lithium ion secondary battery, which is able to perform charging and discharging on repeated cycles, has been used.

In applications needed for a high power output and high energy density to drive motors for EV, HEV and FCV, a single large size battery cannot be manufactured, as a matter of practice, and it has been a general practice to use an assembled battery with a structure in which a plurality of batteries are connected in series. One lithium ion battery forming such an assembled battery has a fundamental structure wherein a positive electrode and a negative electrode are placed via a separator that are filled with nonaqueous electrolysis solution.

Further, another proposal has been made to provide a battery employing a solid electrolyte that is less liable to suffer from short-circuiting phenomenon than that of the electrolyte solution for thereby providing improved safety (see Japanese Patent Application Laid-Open No. 2002-305028). The solid electrolyte battery has a less liability for liquid to leak outside the battery and can be formed in a battery with an increased safety.

SUMMARY OF THE INVENTION

However, with the solid electrolyte battery disclosed in Japanese Patent Application Laid-Open No. 2002-305028, interfaces are present in respective contact surfaces of a positive electrode active material layer, a solid electrolyte layer and a negative electrode active material layer, resulting in an issue with an interference in the flow of ions across the interfaces. Particularly, with the solid electrolyte being employed, the ions are partially clogged under a worse state than that resulting from the electrolysis solution, adversely affecting battery performance resulting from the issue of capability for the ions moving across such interfaces. Among other things, in applications needed to have high power output and high energy density like when driving motors for EV, HEV and FCV, the above issue results in adverse effects to cause difficulties in achieving power output. Thus, the solid electrolyte battery, fabricated in the related art method, no countermeasures have been found to improve the flow of ions across the respective interfaces and as a result, the solid electrolyte battery has less power output with a resultant difficulty in providing a battery with desired high power output and high capacity.

The present invention has been aimed to address the above issues of the related art set forth above, and an object of the present invention is to provide a method of manufacturing a solid electrolyte battery, which is able to improve the flow of ions across respective interlayers of a positive electrode active material layer, a solid electrolyte layer and a negative electrode active material layer. Further, an object of the present invention is to provide a solid electrolyte battery obtained by such a manufacturing method, an assembled battery composed of a plurality of the batteries connected, and vehicles with these mounted.

The first aspect of the present invention provides a method of manufacturing a solid electrolyte battery having an electric power-generating element composed of a positive electrode, a solid electrolyte layer and a negative electrode that are stacked, the method comprising: thermally pressing a composite layer including a positive electrode ink layer, an electrolyte ink layer and a negative electrode ink layer that are formed by coating a positive electrode ink, an electrolyte ink and a negative electrode ink, wherein the positive electrode ink, the electrolyte ink and the negative electrode ink contain a polymer electrolyte.

The second aspect of the present invention provides A method of manufacturing a solid electrolyte battery having an electric power-generating element composed of a positive electrode, a solid electrolyte layer and a negative electrode that are stacked, the method comprising: thermally pressing a composite layer including a positive electrode particle ink layer, an electrolyte ink layer and a negative electrode particle ink layer that are formed by coating a positive electrode particle ink, an electrolyte ink, and a negative electrode particle ink, wherein the positive electrode particle ink includes a positive electrode polymer particle containing a polymer electrolyte, the electrolyte ink includes a polymer electrolyte, and the negative electrode particle ink includes a negative electrode polymer particle containing a polymer electrolyte.

The third aspect of the present invention provides a solid electrolyte battery comprising: an electric power-generating element composed of a positive electrode, a solid electrolyte layer and a negative electrode that are stacked, the positive electrode, the solid electrolyte layer and the negative electrode being formed in accordance with a process comprising: thermally pressing a composite layer including a positive electrode ink layer, an electrolyte ink layer and a negative electrode ink layer that are formed by coating a positive electrode ink, an electrolyte ink and a negative electrode ink, wherein the positive electrode ink, the electrolyte ink and the negative electrode ink contain a polymer electrolyte.

The fourth aspect of the present invention provides an assembled battery comprising: a solid electrolyte battery including: an electric power-generating element composed of a positive electrode, a solid electrolyte layer and a negative electrode that are stacked, the positive electrode, the solid electrolyte layer and the negative electrode being formed in accordance with a process comprising: thermally pressing a composite layer including a positive electrode ink layer, an electrolyte ink layer and a negative electrode ink layer that are formed by coating a positive electrode ink, an electrolyte ink and a negative electrode ink, wherein the positive electrode ink, the electrolyte ink and the negative electrode ink contain a polymer electrolyte, and a plurality of the solid electrolyte batteries are connected and installed in series or in parallel.

The fifth aspect of the present invention provides a combined assembled battery comprising: an assembled battery comprising: a solid electrolyte battery including: an electric power-generating element composed of a positive electrode, a solid electrolyte layer and a negative electrode that are stacked, the positive electrode, the solid electrolyte layer and the negative electrode being formed in accordance with a process comprising: thermally pressing a composite layer including a positive electrode ink layer, an electrolyte ink layer and a negative electrode ink layer that are formed by coating a positive electrode ink, an electrolyte ink and a negative electrode ink, wherein the positive electrode ink, the electrolyte ink and the negative electrode ink contain a polymer electrolyte, and a plurality of the solid electrolyte batteries are connected and installed in series or in parallel.

The sixth aspect of the present invention provides a solid electrolyte battery comprising: an electric power-generating element composed of a positive electrode, a solid electrolyte layer and a negative electrode that are stacked, the positive electrode, the solid electrolyte layer and the negative electrode being formed in accordance with a process comprising: thermally pressing a composite layer including a positive electrode particle ink layer, an electrolyte ink layer and a negative electrode particle ink layer that are formed by coating a positive electrode particle ink, an electrolyte ink, and a negative electrode particle ink, wherein the positive electrode particle ink includes a positive electrode polymer particle containing a polymer electrolyte, the electrolyte ink includes a polymer electrolyte, and the negative electrode particle ink includes a negative electrode polymer particle containing a polymer electrolyte.

The seventh aspect of the present invention provides an assembled battery, comprising: a solid electrolyte battery including: an electric power-generating element composed of a positive electrode, a solid electrolyte layer and a negative electrode that are stacked, the positive electrode, the solid electrolyte layer and the negative electrode being formed in accordance with a process comprising: thermally pressing a composite layer including a positive electrode particle ink layer, an electrolyte ink layer and a negative electrode particle ink layer that are formed by coating a positive electrode particle ink, an electrolyte ink, and a negative electrode particle ink, wherein the positive electrode particle ink includes a positive electrode polymer particle containing a polymer electrolyte, the electrolyte ink includes a polymer electrolyte, and the negative electrode particle ink includes a negative electrode polymer particle containing a polymer electrolyte, and a plurality of the solid electrolyte batteries are connected and installed in series or in parallel.

The eighth aspect of the present invention provides a combined assembled battery comprising: an assembled battery comprising: a solid electrolyte battery including: an electric power-generating element composed of a positive electrode, a solid electrolyte layer and a negative electrode that are stacked, the positive electrode, the solid electrolyte layer and the negative electrode being formed in accordance with a process comprising: thermally pressing a composite layer including a positive electrode particle ink layer, an electrolyte ink layer and a negative electrode particle ink layer that are formed by coating a positive electrode particle ink, an electrolyte ink, and a negative electrode particle ink, wherein the positive electrode particle ink includes a positive electrode polymer particle containing a polymer electrolyte, the electrolyte ink includes a polymer electrolyte, and the negative electrode particle ink includes a negative electrode polymer particle containing a polymer electrolyte, and a plurality of the solid electrolyte batteries are connected and installed in series or in parallel.

BRIEF DESCRIPTION OF THE DRAWINGS

The invention will now be described with reference to the accompanying drawings wherein;

FIG. 1 is a schematic view showing positive electrode polymer particles for use in the present invention;

FIG. 3 is a cross-sectional view illustrating an appearance after positive electrode particle ink is coated on a collector;

FIG. 4 is a cross-sectional view illustrating an appearance after electrolyte particle ink is coated on a positive electrode particle ink layer;

FIG. 5 is a cross-sectional view illustrating an appearance after negative electrode particle ink is coated on an electrolyte particle ink layer;

FIG. 6 is a cross-sectional view illustrating an appearance after thermal pressing a composite layer composed of the positive electrode particle ink layer, the electrolyte particle ink layer and the negative electrode particle ink layer;

FIG. 8 is a schematic cross-sectional view illustrating a solid electrolyte battery of bipolar type;

FIG. 9A is a plan view showing an assembled battery using the solid electrolyte battery of the present invention;

FIG. 9B is a front view showing the assembled battery using the solid electrolyte battery of the present invention;

FIG. 9C is a side view showing the assembled battery using the solid electrolyte battery of the present invention;

FIG. 10A is a plan view showing another example of the assembled battery using the solid electrolyte battery of the present invention;

FIG. 10B is a front view showing the another example of the assembled battery using the solid electrolyte battery of the present invention;

FIG. 10C is a side view showing the another example of the assembled battery using the solid electrolyte battery of the present invention;

FIG. 11A is a plan view showing a combined assembled battery using the solid electrolyte battery of the present invention;

FIG. 11B is a front view showing the combined assembled battery using the solid electrolyte battery of the present invention;

FIG. 11C is a side view showing the combined assembled battery using the solid electrolyte battery of the present invention;

DETAILED DESCRIPTION OF THE PREFERRED EMBODIMENT

Figure 2C:
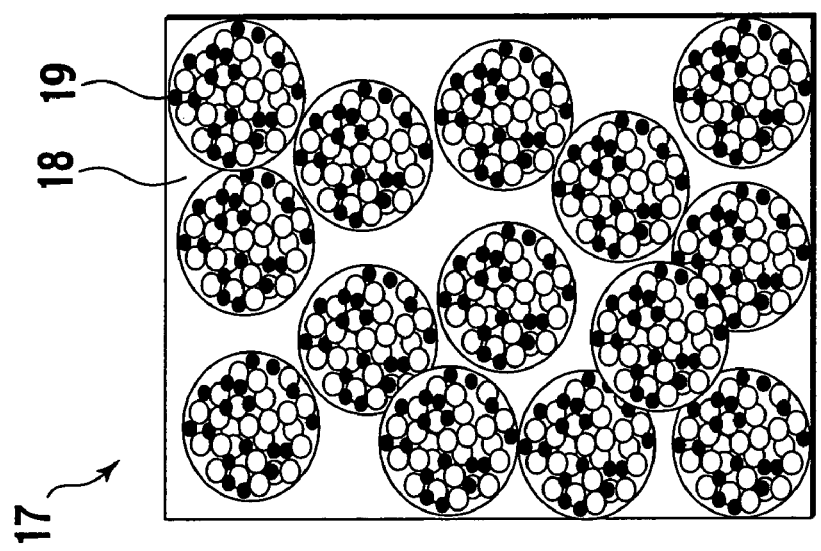
FIG. 2C is a schematic view showing negative electrode particle ink.

Hereinafter, description will be made of embodiments of the present invention with reference to the drawings.

A method of manufacturing a solid electrolyte battery, of a first embodiment according to the present invention, features that the method of manufacturing a solid electrolyte battery, in which a positive electrode, a solid electrolyte layer and a negative electrode are stacked to form an electric power-generating element, includes step of thermally pressing a composite layer composed of a positive electrode ink layer, an the electrolyte ink layer and a negative electrode ink layer that are formed by coating positive electrode ink, electrolyte ink and negative electrode ink. The positive electrode ink, the electrolyte ink and the negative electrode ink respectively contain polymer electrolyte. More preferably, the method of the present invention features to have steps (1) to (7) as described below.

(1) Step of preparing positive electrode ink containing polymer electrolyte, conductive material, positive electrode active material and solvent (positive electrode ink preparation step).

(2) Step of preparing negative electrode ink containing polymer electrolyte, negative electrode active material and solvent (negative electrode ink preparation step).

(3) Step of preparing electrolyte ink containing polymer electrolyte and solvent (electrolyte ink preparation step).

(4) Step of coating one of positive electrode ink or negative electrode ink on a collector (positive electrode/negative electrode ink coating step).

(5) Step of coating electrolyte ink on a positive electrode ink layer or a negative electrode ink layer that are formed by the above coating steps (electrolyte ink coating step).

(6) Step of coating the other one of positive electrode ink or negative electrode ink on the electrolyte ink layer that is formed by the above coating step (negative electrode/positive electrode ink coating step).

(7) Step of thermally pressing a composite layer composed of the positive electrode ink layer, the electrolyte ink layer and the negative electrode ink layer that are formed by the above coating steps (thermally pressing step).

Further, with a second embodiment, a manufacturing method features that the method of manufacturing a solid electrolyte battery, in which a positive electrode, a solid electrolyte layer and a negative electrode are stacked to form an electric-power generating element, includes step of thermally pressing a composite layer composed of a positive electrode particle ink layer, an electrolyte ink layer and a negative electrode particle ink layer. The positive electrode particle ink layer, the electrolyte ink layer and the negative electrode particle ink layer are formed by coating ink composed of positive electrode polymer particles which are dispersed in solvent, polymer electrolyte ink, and ink composed of negative electrode polymer particles which are dispersed in solvent. The positive electrode polymer particles and the negative electrode polymer particles contain the polymer electrolyte, More preferably, the method of the second embodiment features to steps (1) to (9) described below.

(1) Step of preparing positive electrode polymer particles containing polymer electrolyte, conductive material and positive electrode active material (positive electrode polymer particle preparation step).

(2) Step of preparing negative electrode polymer particles containing polymer electrolyte and negative electrode active material (negative electrode polymer particle preparation step).

(3) Step of preparing positive electrode particle ink by dispersing the above-described positive electrode polymer particles in solvent (positive electrode particle ink preparation step).

(4) Step of preparing negative electrode particle ink by dispersing the above-described negative electrode polymer particles in solvent (negative electrode particle ink preparation step).

(5) Step of preparing electrolyte ink containing polymer electrolyte and solvent (electrolyte ink preparation step).

(6) Step of coating one of the above-described positive electrode particle ink or negative electrode particle ink on a collector (positive electrode particle ink/negative electrode particle ink coating step).

(7) Step of coating electrolyte ink on a positive electrode particle ink layer or a negative electrode particle ink layer that are formed by the above coating steps (electrolyte ink coating step).

(8) Step of coating the other one of positive electrode particle ink or negative electrode particle ink on an electrolyte ink layer that is formed by the above coating step (negative electrode particle ink/positive electrode particle ink coating step).

(9) Step of thermally pressing a composite layer composed of a positive electrode particle ink layer, the electrolyte ink layer and a negative electrode particle ink layer that are formed by the above coating steps (thermally pressing step).

More preferably, the electrolyte ink, in step (5) of preparing the electrolyte ink, includes electrolyte particle ink composed of polymer electrolyte grained in particles and dispersed in the solvent.

First, a solid electrolyte battery, to which either the first embodiment or the second embodiment of the present invention can be applied, has structure that uses a solid electrolyte layer as an electrolyte layer.

The solid electrolyte battery, classified in terms of a structure and form, is not limited to particular structures, such as a laminate type (flat type) battery and a wound type (cylindrical type) battery, and the present invention may have applications to any structures. With the present invention, it is preferable for a battery to take a flat structure.

Similarly, the solid electrolyte battery, classified in terms of a kind of solid electrolyte layer, is not limited to such a particular kind of a solid electrolyte layer. That is, the present invention may have applications to any of a gel polymer battery, using polymer gel electrolyte as a solid electrolyte layer, and a true polymer battery employing an entire solid polymer electrolyte. The solid electrolyte layer may include the polymer gel electrolyte or the entire solid polymer electrolyte that are independently employed. In addition, these electrolytes may be used under circumstances impregnated in or carried on a separator.

Further, the solid electrolyte battery, classified in a type of usage, may be applied to any of a primary battery and a secondary battery. Preferably, the present invention is suited to a power supply needed to have high power output and high energy density such as batteries for use in EV, HEV and FCV, the present invention is preferably suited to the secondary battery.

Furthermore, the solid electrolyte battery, as viewed in terms of a type of electrical connection, may have application to any of a non-bipolar type battery and a bipolar type battery. With the bipolar type battery, a battery can be structured to have an increased battery voltage with excellent output characteristics. With the non-bipolar type battery, a battery can be structured to have an increased battery capacity with excellent energy characteristics. With the present invention, an assembled battery is provided by the use of a plurality of bipolar type batteries, with a high regard for power outputs, and a plurality of non-bipolar type batteries, with a high regard for energy density, which are connected to one another, enabling mutual weak points to be compensated and achieving reduction in weight and size of the assembled battery.

Moreover, in a view of metallic ions that moves across associated electrodes, the present invention may have applications to any of a lithium ion secondary battery, a sodium ion secondary battery, a potassium ion secondary battery, a nickel-hydrogen secondary battery and a nickel-cadmium secondary battery. Preferably, the present invention may have application to the lithium ion secondary battery because of its high voltage in unit cell, high energy density, high power output density and an excellent capability to be used as a main power supply, for driving a vehicle, and an auxiliary power source for the same. Accordingly, in the following description, the present invention is described with reference to an example of a method of manufacturing a solid electrolyte lithium ion secondary battery.

Hereinafter, a method of a first embodiment according to the present invention is described in line with a sequence of suitable steps (1) to (7) described above.

(1) Positive Electrode Ink Preparation Step

Positive electrode ink (positive electrode slurry) can be prepared by first adding conductive material and polymer electrolyte to a solvent containing positive electrode active material in order to form a mixture, and stirring the mixture, using suitable stirring means such as a homomixer in order to provide a desired viscosity.

Resulting positive electrode ink takes the form of slurry that contains polymer electrolyte, conductive material, positive electrode active material and solvent and may further contain other components, such as electrolyte salt (lithium salt), polymerization initiator and binder at arbitrary ratios. Even in this case, these other components can be added to the solvent, containing positive electrode active material, in the same manner as set forth above and stirred for the preparation of positive electrode ink.

In order to increase electric conductivity of positive electrode active material, substantially entire particle surfaces of positive electrode active material may be preferably coated with electrically conductive particles. Consequently, prior to preparing positive electrode ink, appropriate amounts of positive electrode active material, conductive material and, if desired, binder may be mixed to allow the surfaces of particles of positive electrode active material to be coated with fine particles of conductive material.

By adjusting the amount of solvent to be added, the viscosity of resulting positive electrode ink may be suitably regulated such that the viscosity is suited to a positive electrode ink coating method that will be described below.

Here, an example of polymer electrolyte that can be used as positive electrode ink includes polymer having ion conductivity. When using polymer gel electrolyte as the solid electrolyte layer, an example of polymer electrolyte may include polymer with no-lithium ion conductivity. By permitting gaps between positive electrode active materials in the positive electrode active material layer (positive electrode layer) to be filled, such polymer electrolyte has increased ion conductivity in the positive electrode active material layer. This results in improvements in power output density and safety of a solid electrolyte battery as a whole.

Examples of polymer having ion conductivity may include polyethylene oxide (PEO), polypropylene oxide (PPO) and copolymer of these components. Preferably, polymer may desirably have functional groups with a cross-linking structure, for example, carbon-carbon double bond. This is because the use of such functional groups for cross-linking polymer electrolyte contributes to improvement not only in a mechanical strength but also in the elimination of interfaces in interlayers with a resultant integrated structure.

Examples of polymer, with no ion conductivity, may include polyvinylidene fluoride (PVdF), polyvinyl chloride (PVC), polyacrylonitrile (PAN) and polymethyl methacrylate (PMMA). Also, the above-described PAN and PMMA belong rather to a kind of elements falling in a category with almost no ion conductivity, so that these compounds can be treated as polymers that have the above-described ion conductivity. But these compounds are herein exemplary listed as polymers with no lithium ion conductivity.

Further, when using polymer gel electrolytes as the solid electrolyte layer, electrolytic salt and plasticizer may be suitably added to these polymer electrolytes on an appropriate stage to cause the same to be gelatinized. In such cases, the mass ratio between a polymer electrolyte and an electrolysis solution may be determined in accordance with an intended use and normally fall in a value ranging from 2:98 to 90:10. Also, the stage on which the electrolysis solution is added may stand before the electric-power generating element is completely sealed with a battery sheath member. Moreover, the electrolytic salt and plasticizer, forming the electrolysis solution, may be added on separate stages, respectively.

Examples of the plasticizer may include an organic solvent, such as aprotic solvent, composed of at least one kind of or more than two kinds of elements, which are mixed to one another, selected from the group consisting of: cyclic carbonates such as propylene carbonate and ethylene carbonates; linear carbonates such as dimethyl carbonate, ethylmethyl carbonate and diethyl carbonate; ethers such as tetrahydrofuran, 2-methyl tetrahydrofuran, 1,4-dioxane, 1,2-dimethoxy ethane and 1,2-dybutoxy ethane; lactones such as γ-butyrolactone; nitryls such as acetonitrile; esters such as methyl proprionate; amides such as dimethyl formamide; and methyl acetate and methyl formate.

An example of positive electrode active material, which can be used as positive electrode ink, may preferably include lithium-transition metal composite oxides. This may be combined in use with Li—Mn group composite oxides such as spinel $LiMn_2O_4$ (spinel $LiMnO_4$), Li—Co group composite oxides such as $LiCoO_2$, Li—Ni group composite oxides such as $LiNiO_2$, Li—Cr group composite oxides such as $Li_2Cr_2O_7$ and $Li_2CrO_4$, Li—Fe group composite oxides such as $LiFeO_2$ and compound in which a part of these transition metals are substituted by other element. These lithium-transition metal composite oxides are materials that have excellent reactivity and cycle durability and are low in cost. For this reason, by using these materials, a battery can be formed to be excellent in power output characteristics. In addition to these, other compounds may be combined which include: lithium phosphate compounds, such as $LiFePO_4$, composed of transition metal and lithium, and sulfate compounds; transition metal oxides, such as $V_2O_5$, $MnO_2$, $TiS_2$, $MoS_2$ and $MoO_3$, and sulfides; and $PbO_2$, AgO and NiOOH.

A mean particle diameter of the above-described positive electrode active material may preferably fall in a value ranging from 0.1 to 20 μm and more preferably in a value ranging from 0.1 to 1 μm. Such a particle diameter of positive electrode active material can be measured by a scanning electron microscope (SEM) and a transmission electron microscope (TEM).

Further, while positive electrode active material may take different shapes that are available to come off, depending on a kind of and methods of manufacturing the materials, and include spherical, plate-like, a circular, columnar and horny configurations, any shape may be employed with no issues. Preferably, an optimum shape may be suitable selected to be able to improve battery characteristics such as charging and discharging characteristics. Also, when measuring a mean particle diameter of positive electrode active material that has been described above, the mean particle diameter is represented in an absolute maximum length because the particles are not uniform in shape. As used herein, the term "absolute maximum length" refers to the maximum length "L" in a distance between arbitrary two points on a contoured line of a particle 91 as shown in FIG. 9.

Examples of conductive material available as positive electrode ink may include acetylene black, carbon black, graphite, vapor grown carbon fibers (VGCF) and metal powder.

A mean particle diameter of conductive material is not particularly limited and may be sufficed to lie in a value ranging from 20 nm to 1 μm. To enhance manufacturability with the achievement in further increased power output and high capacity, the mean particle diameter may preferably fall in a value of approximately 100 nm. The particle diameter of such conductive material can be measured with the scanning electron microscope (SEM) and the transmission electron microscope (TEM).

Examples of the solvent available to be used for positive electrode ink may include acetonitrile, N-methyl-2-pyrolidone (NMP) and n-pyrrolidone, which may be suitably selected depending on a kind of positive electrode ink.

Examples of the binder available to be used for positive electrode ink may include polyvinylidene fluoride, hexafluoropropylene (HFP), styrene butadiene rubber (SBR) and polyimide.

Electrolyte salts (lithium salts), available to be used for positive electrode ink, are not particularly limited provided that they are stable against positive electrode active material and form nonaqueous material enabled for lithium ions to move for electrode reactions with positive electrode active material. Examples of such material may include: anion salts of inorganic acid, such as $LiBF_4$, $LiPF_6$, $LiClO_4$, $LiAsF_6$, $LiTaF_6$, $LiAlCl_4$, $Li_2B_{10}Cl_{10}$; and anion salts of organic acid, such as $LiCF_3SO_3$, $LiN(SO_2CF_3)$, $LiN(SO_2C_2F_5)_2$ (LiBETI: lithium bisperfluoroethanesulfonimide) and LiBOB (Lithium bis(oxalato)borate), or a mixture of these compounds.

Polymerization initiator, which can be used for positive electrode ink, is used when polymer electrolyte, which forms raw material (polymer) of a solid electrolyte, has cross-linking functional groups. With the present invention, due to an ability of performing polymerization in a simple and reliable manner, polymerization may be preferably executed to allow the polymer to be thermally polymerized during drying stage or during thermal pressing in subsequent works. This is because the thermal pressing allows the polymer to thermally polymerize into cross-linking structures whereby interfaces in respective interlayers can be eliminated to provide further improved ion conductivity. With such a view in mind, it may be preferable to employ azobisisobutyronitrile and t-hexyl peroxypivalate as thermal polymerization initiators. However, the present invention is not intended to these compounds and desired materials may be suitably selected depending on polymerizing methods (such as thermal polymerization, ultraviolet polymerization, radiation polymerization and electron-beam polymerization) and a kind of compounds to be polymerized. Although benzildimethylketal can be listed as the ultraviolet polymerization initiator, the present invention is not limited to such material. The amount of polymerization initiator to be added may be determined depending on the number of cross-linking functional groups contained in the polymer electrolyte. Normally, the polymerization initiator to be added may lie in a value of approximately 0.01 to 1% by mass of the polymer electrolyte described above.

The blending quantity of the positive electrode active material, the conductive material, the polymer electrolyte, the electrolyte salt, the binder, the polymerization initiator and the solvent to be blended in positive electrode ink may be determined in consideration of intended use (with a high regard for power output and energy) and ion conductivity of a battery.

(2) Negative Electrode Ink Preparation Step

Negative electrode ink (negative electrode slurry) can be prepared to have a desired viscosity first by adding polymer electrolyte to a solvent, containing negative electrode active material, and stirring the resulting mixture with suitable agitating means such as a homomixer.

The prepared negative electrode ink is a slurry that contains polymer electrolyte, negative electrode active material and solvent and may contain other components such as conductive material, electrolyte salt (lithium salt), polymer initiator and binder in respective arbitrary amounts. Even in such cases, these other components may be added to the solvent, containing negative electrode active material, in the same manner as that set forth above and stirred to prepare negative electrode ink. When using material with high conductivity, such as carbonaceous material, as the negative electrode active material, the negative electrode ink has no need to necessarily contain conductive material. However, when using metals available to form an alloy with lithium, materials with no conductivity and other components with low conductivity, there is a need for using the relevant conductive material.

Further, the viscosity of the prepared negative electrode ink may be regulated by adjusting the amount of solvent to be added so as to provide a viscosity suited for a negative electrode ink coating method that will be described below.

Polymer electrolytes, conductive materials, electrolyte salts (lithium salts), polymerization initiators, binders and solvents that can be used for negative electrode ink are similar to those which are described above with reference to the positive electrode ink preparation step (1) and description of the same is herein omitted.

The negative electrode active material, which can be used for negative electrode ink, may include any constituents provided that these materials are able to dope or dedope lithium in a range below 2.0V relative to the lithium potential. More particularly, examples of the negative electrode active material include: hard carbon, soft carbon, and a variety of graphites such as artificial graphites, natural graphites and pyrolytic graphites; cokes such as pitch coke, needle coke and petroleum coke; organic polymer compound calcined body resulting from glassy carbons, phenol resin and furan resin that are calcined and carbonized; and carbonaceous materials such as carbon fiber, active carbon and carbon black.

Further, examples of negative electrode active material may also include metals that are able to form an alloy with lithium, and the alloy of these metals. More particularly, these include compounds, such as oxides or nitrides of iron, ruthenium, molybdenum, tungsten and tin, which can be dope or dedope lithium at a relatively low voltage potential, and alloys represented by, in addition to 13 Group typical elements, elements such as silicon (Si) and Tin (Sn) or MxSi and MxSn (provided that in formulae, M represents more than at least one metal element except for Si or Sn). Among these, Si or Si alloy may be preferably used. In addition, lithium metal oxides, such as lithium titanate, may also be used.

Furthermore, negative electrode ink may contain film-forming materials for the purpose of suppressing a drop in capacity caused by battery cycles. Examples of the film forming materials may include film-forming materials disclosed in Japanese Patent Application Laid-Open No. 2000-123880.

(3) Electrolyte Ink Preparation Step

The electrolyte ink (electrolyte slurry) can be prepared with a desired viscosity first by adding polymer electrolyte to a solvent and stirring the resulting mixture with suitable agitating means such as a homomixer.

The prepared the electrolyte ink takes the form of slurry containing polymer electrolyte and solvent and may include other components, such as electrolyte salt (lithium salt) and polymerization initiator in respective arbitrary amounts. Even in such a case, these components may be also added to the solvent in the same manner as described above and stirred for preparation of electrolyte ink.

Further, the viscosity of the prepared the electrolyte ink may be regulated through adjustment of the amount of solvent to be added such that the viscosity is suited for an electrolyte ink coating method described later.

Polymer electrolyte, conductive material, electrolyte salt (lithium salt), polymer initiator and binder, which can be used for the electrolyte ink, may include the same components as those described in conjunction with the positive electrode ink preparation step and, so, description of the same is herein omitted.

Also, with the first embodiment according to the present invention, the sequence in steps (1) to (3), set forth above, are not particularly limited and may be suitably adjusted until respective steps, which will be described below, subsequent to step (4) are executed.

Further, when using polymer gel electrolyte for a solid oxide electrolyte layer, electrolyte salt and plasticizer, serving as electrolysis solution component, may be preliminarily contained in positive electrode ink, negative electrode ink and electrolyte ink, respectively. Or, by carrying out a vacuum liquid pouring method on an appropriate stage prior to or subsequent to thermal pressing step that will be described later, the electrolyte components may be poured into the electrolyte ink layer, a positive electrode ink layer and a negative electrode ink layer for gelatinizing the same.

(4) Positive Electrode/Negative Electrode Ink Coating Step

In positive electrode ink/negative electrode ink coating, either the positive electrode ink or the negative electrode ink is coated on a collector. This enables a positive electrode ink layer (positive electrode active material layer) or a negative electrode ink layer (negative electrode active material layer) to be formed. Hereinafter, this step is described with reference to an example where the positive electrode ink, the electrolyte ink and the negative electrode ink are coated in this order.

In particular, after the prepared positive electrode ink is coated on the collector, the positive electrode ink is dried to remove residual solvent.

Examples of the collector, set forth above, may preferably include electrically conductive metals, such as aluminum, aluminum alloy, a stainless steel (SUS) foil and titanium and, in addition to these, further include clad material composed of nickel and aluminum, clad material composed of SUS and aluminum or plated material composed of these metals in combination. Further, the collector may be of the type that has a metallic surface covered with an aluminum layer. Furthermore, depending on circumstances, a collector may be employed which is composed of more than two laminated metallic foils. Particularly, as for a positive electrode collector, conductive metals such as aluminum, aluminum alloy, SUS and titanium may be listed. Examples of the negative electrode collector may include conductive metals such as copper, nickel silver and SUS. Also, with a bipolar type battery, a collector has one surface formed with a positive electrode layer and the other surface formed with a negative electrode layer. As for the collector of such a bipolar type battery, in addition to the collector mentioned above, a composite collector can be employed which is comprised of a positive electrode collector and a negative collector that are joined to one another. These collectors may be electrically connected through an intermediate layer that directly has electric conductivity or has electric conductivity through third material. Moreover, the collector may be formed in various shapes, such as a flat plate and a lath plate, i.e., a plate that is made with a notch and expanded in a plexus configuration.

The collector has a thickness normally falling in a value ranging from 1 to 100 µm.

Examples of a method of coating positive electrode ink on the collector may include a method using a variety of coaters or applicators, such as a bar coater, a die coater and a spray coater, a spin coating method and screen printing method and using these methods may allow positive electrode ink to be coated in a given thickness. In addition, the ink coating method may further include an ink jet system to achieve the coating.

The coating method, using the coater and the spin coat, is a means effective for coating positive electrode ink in a given thickness. Further, the coating method, based on the screen-printing method and the ink jet printing method, enables positive electrode ink to be coated in an extremely thin thickness that would be hard to be achieved by the coater. In addition, using a plurality of inks in different compositions enables patterning coating, which is impossible to be achieved with coating technology using a related art coater, to be simply carried out. For this reason, using the ink in different compositions enables the coating in an arbitrary pattern so as to provide a further uniform temperature distribution and current density distribution in the positive electrode layer.

Particularly, with the coating method using the ink jet system, multiproduct production can be accomplished merely by altering patterns on a printing screen in software of a computer connected to an ink jet printer. For this reason, the ink jet system is superior to the screen-printing method in respect of easy simplification of production equipment. That is, with the coating method based on the ink jet system, there is no need for a different screen to be prepared for each pattern, like in the screen-printing method, or for different screen to be replaced. Also, when altering the composition of positive electrode ink, an ink cartridge of an ink jet printer or the number of cartridges may be increased or decreased depending on needs in accordance with alteration in color display on a printing screen, thereby making it possible to comply design change in an extremely simple fashion. As used herein, the term "cartridge" refers to detachable containers that are filled with positive electrode ink, negative electrode ink and electrolyte ink, respectively.

Hereinafter, the coating method based on the ink jet system is described below.

The ink jet method is a process that allows an ink jet nozzle to inject positive electrode ink, negative electrode ink and electrolyte ink in liquid droplets that are coated on members such as a collector, an electrode ink layer and an electrolyte ink layer that are dried, a separator and a glass substrate. This enables a uniform and thin coated layer to be formed on a given area of the substrate, such as the collector, such that positive electrode ink and, in addition, negative electrode ink and electrolyte ink can be coated in optimum patterns.

The above-described ink jet system is classified into three systems including a piezo element system, a thermal ink jet system and a continuous system and although any of these systems may be adopted, the piezo element system may be preferably adopted from a viewpoint of thermal stability of battery materials. As used herein, the term "piezo element system" refers to a system using a piezo type, generally known as a drop-on-demand system, which is operative to inject liquid using ceramics (piezo element) that is deformable with applied voltage. The ink jet system using the piezo element is excellent in thermal stabilities of electrode materials and polymer materials contained in positive electrode ink, negative electrode ink and electrolyte ink and is able to vary the amounts of respective inks to be coated. Further, the piezo element type ink jet system is excellent in that it is possible to inject liquid with a relatively high viscosity in a more reliable, stable and precise manner than those achieved by the other ink jet head and highly effective for injecting liquid with the viscosity increasing up to 10 Pa·s (100 cP).

In general, the ink jet head of the piezo type is internally formed with liquid chambers in which respective inks are stored. The ink jet head has a lower area formed with nozzles in a large number of arrays. Also, located on an upper area of the ink jet head are a piezo element for injecting inks from the associated liquid chambers, respectively, and a driver for activating the piezo element. The structure of such an ink jet head is just one embodiment and not particularly limited. With an ink guide section made of plastic, there is a risk that the solvent, which can be contained in respective inks, is liable to dissolve the plastic portions. Accordingly, the ink guide section may be preferably made of metal excellent in anti-dissolving property.

Examples of the method of coating ink in the ink jet method described above include: (1) a method in which one ink jet head is located for each ink to allow liquid injecting operations of plural minute-diameter nozzles to be independently controlled, respectively, for thereby coating respective inks on a surface of a collector in optimum patterns; and (2) a method in which a plurality of ink jet heads are located for each ink to allow liquid injecting operations of these ink jet heads to be independently controlled, respectively, for thereby coating respective inks on the surface of the collector in the optimum patterns.

In the methods (1) and (2) set forth above, to independently control the liquid injecting operations, there is a control method using computer software. An ink jet printer may be connected to a computer in which appropriate application software is incorporated to prepare a desired pattern for thereby performing intended control in response to electric signals resulting from such software. As for such application software, there are Power Point (manufactured by Microsoft) and AutoCAD (manufactured by AutoDesk) that are application software for preparing drawings and figure-image processing.

A volume of the liquid droplets to be injected from the ink jet head may preferably lie in a value ranging from 1 to 100 pl. To obtain the liquid droplets with a volume less than 1 pl, it becomes hard to prepare active material particles that comply with the minute diameter nozzle.

Further, for the ink jet method, it is preferable to use inks each with a viscosity lying in a value of 0.1 to 100 cP, preferably 0.5 to 10 cP, and more preferably 1 to 3 cP at a temperature of 25° C. If the viscosity of ink is less than 0.1 cP, then, it is feared of a difficulty in controlling the flow rate of ink and with the viscosity exceeding the value of 100 cP, it is feared that ink cannot pass across the nozzle.

In order to dry coated positive electrode ink, a vacuum drier may be employed. A drying condition may be determined depending on coated positive electrode ink and, though not univocally defined, the drying may be usually conducted for a time period of one minute to eight hours, preferably three minutes to one hour, at temperatures of 20 to 200° C., preferably 80 to 150° C. However, such a drying condition is not limited and may be suitably determined depending on the amount of solvent contained in coated positive electrode ink.

A thickness of the positive electrode layer (positive electrode active material) resulting from the above draying step may be suitably regulated depending on intended use of a battery and usually lie in a value ranging from 5 to 50 μm. Also, in the present invention, it is preferable for the above thickness to be determined in consideration of the occurrence of a change in thickness before and after thermal pressing operations.

(5) Electrolyte ink Coating Step

In electrolyte ink coating step, the electrolyte ink is coated on an electrode ink layer that is formed by the coating. This enables the formation of an electrolyte ink layer.

More particularly, the prepared electrolyte ink is coated on the positive electrode ink layer and then dried to remove residual solvent.

Here, a method of coating the electrolyte ink on the positive electrode layer and a drying method may be applied in the same manner as those of coating method (4) described above and, so, detailed description of the same is herein omitted.

A drying condition may be determined depending on the electrolyte ink to be coated and, though not univocally defined, the drying may be usually conducted for a time period of thirty minutes to twelve hours at temperatures of 30 to 110° C., preferably 80 to 150° C. However, such a drying condition is not limited and may be suitably determined depending on the amount of solvent contained in coated electrolyte ink.

However, the first embodiment according to the present invention is not limited to electrolyte ink coating step set forth above and may be coated in alternative step depending on a kind of or a structure of the electrolyte layer. As for such alternative step, a separator may be placed on the positive electrode ink layer and subsequently prepared electrolyte ink is coated on the separator, whereupon drying is conducted to remove residual solvent. By so doing, the object of the present invention may be accomplished. The coating method and drying method to be applied in this event may be carried out in the same way as coating step (4) described above. The use of the separator increases the amount of electrolyte to be filled and ensures thermal conductivity.

Further, as for a further alternative of the first embodiment according to the present invention, a separator may be placed on the positive electrode ink layer and subsequently prepared negative electrode ink is coated on the separator in accordance with step (6) described below, whereupon drying may be conducted to remove residual solvent. Thereafter, the separator may be impregnated and coated with the electrolyte ink upon which the separator may be dried to remove residual solvent. In order to coat the electrolyte ink on the separator this time, a stack body containing positive electrode ink, a separator and negative electrode ink may be immersed in the electrolyte ink. Further, the electrolyte ink may be poured into the separator of the stack body set forth above. This is because adjusting the viscosity of the electrolyte ink enables the separator and the electrode to be adequately impregnated with the electrolyte ink.

In addition, as for a further alternative of the first embodiment according to the present invention, as shown in an Example 1 described below, by separately coating the above-described electrolyte ink on a suitable film, such as a polyethylene terephthalate film, and drying or heating the film for dry under inert atmosphere while concurrently causing polymerization of this compound to form an electrolyte layer, the resulting electrolyte layer may be stacked on the positive electrode ink layer obtained in step (4) described above. This is because the use of such step enables thermal pressing operation to be conducted in subsequent step to eliminate interfaces in the interlayers among the electrolyte ink layer, the positive electrode ink layer and the negative electrode ink layer to allow thee layers to be integrated.

Furthermore, as for a further alternative of the first embodiment according to the present invention, by causing an appropriate separator, made of polyethylene, to be impregnated with the above-described electrolyte ink in separate step, drying the separator under inert atmosphere to cause polymerization to occur for preparing an electrolyte layer, the resulting separator may be stacked on the positive electrode layer obtained in step (4) set forth above.

When forming the electrolyte ink layer separately as set forth above, a thickness of the electrolyte ink layer can be controlled using spacers. When causing polymerization to occur using an optical polymerization initiator this time, the optical polymerization initiator may be poured into gaps with light transmitting properties and may be irradiated with an ultraviolet ray using an ultraviolet ray irradiator. This enables the polymer in the electrolyte ink to be subjected to photo-chemical polymerization to promote cross-linking reactions for forming a film. Also, it may be possible to cause cross-linking by heating during thermal pressing. Depending on a kind of polymerization initiator, radiation polymerization, electron-beam polymerization and thermal polymerization may be appropriately used.

Further, there is a probability for a film substrate, for use in the formation of an electrolyte ink layer, to be separately heated as set forth above at a temperature of 80° C. during a fabrication process. Therefore, it may be preferable for the film substrate to be of the type that has an adequate heat resistant property at the above temperature, no reactivity with the electrolyte ink and a mold releasing capability to ease the releasing of the substrate from a mold during a fabrication process. In particular, examples of the substrate may include polyethylene terephthalate and polyethylene film.

Also, in any alternatives, a width of the electrolyte ink layer may be preferably set to be slightly larger than a width of the positive electrode ink layer from a viewpoint of a capability of preventing short-circuiting due to contact between the positive and negative electrodes.

As for the above-described separator, there are a porous sheet and an nonwoven fabric separator. The porous sheet may include a micro-porous separator of polyolefin group such as a micro-porous polyethylene film, a micro-porous polypropylene film and a micro-porous ethylene-polypropylene copolymer film. The above-described micro-porous separator of polyolefin group, having a chemically stable property against organic solvent, has an effect excellent in the suppression of reactivity with the electrolyte.

Examples of material of the micro-porous sheet, such as the above-described micro-porous separator of polyolefin group may include polyethylene (PE), polypropylene (PP), a stack body, formed in a three-layer structure with PP/PE/PP, and polyimide.

Examples of material of the nonwoven fabric separator may include: polyolefin such as cotton, rayon, acetate, nylon, polyester, polypropylene and polyethylene; polyimide; and aramid, which can be solely used or in a mixture of more than two compounds depending on intended use.

Further, an apparent density of the nonwoven fabric may be sufficed to lie in a value to satisfy adequate battery characteristics with the use of the impregnated electrolyte. That is, if the apparent density of the nonwoven fabric is too large, a ratio of areas occupied by non-electrolyte material in the electrolyte material layer becomes too large, resulting in deterioration in ion conductivity of the electrolyte layer.

Though a thickness of the above-described separator cannot be univocally defined because the thickness varies depending on intended use, the thickness of the separator may preferably lie in a value ranging from 1 to 200 µm in application to a secondary battery for driving a motor of an electric vehicle. With the separator having the thickness in such a range, the separator has favorable electrolyte-retaining ability, while suppressing an increase in resistance. Also, the above-described range is preferable because of the reason that it is desirable to prevent the occurrence of short-circuiting resulting from particles intruding into the separator and to narrow a space between adjacent electrodes with a view to providing an increased power output. Moreover, due to the occurrence of an increase in an electrode surface area in a structure where a plurality of batteries are connected, a separator may be preferably used which is of an increased thickness type among those which lies in the above-described range in order to increase reliability of a battery.

The micro-pores of the above-described separator may have a mean diameter of a value equal to or less than 1 µm. With the mean diameter of the pores of the separator lying in such a range, a "shut down phenomenon" immediately occurs wherein the separator is caused to melt resulting in the occurrence of closed micro-pores due to heat build-up. This increases reliability in deficient operations, resulting in an improvement in heat-resistance. That is, due to the immediate occurrence of the "shut down phenomenon" wherein the separator is caused to melt and the micro-pores are closed when a battery temperature progressively increases due to overcharging, Li ions are interfered to move from the positive electrode toward the negative electrode, thereby causing the battery to be interrupted to be charged any further. Thus, the battery is avoided from overcharging, thereby addressing an issue of overcharging. As a result, not only safety of the battery can be improved but also thermally welded portions of a battery sheath material can be protected from opening due to leakage of gas. Here, the mean diameter of the micro-pores of the separator can be calculated by observing the separator with a scanning electron microscope to allow a resulting photograph to be statistically processed with an image analyzer as the mean diameter.

The micro-porous separator of the polyolefin group may preferably have a porosity of a value ranging from 20 to 50%. With the separator having the porosity falling in such a range, it becomes possible to enhance both power output and reliability from a viewpoint of avoiding deterioration in power output caused by an increase in resistance of the electrolyte and preventing the occurrence of short-circuiting caused by particles penetrating the pores of the separator. As used herein, the term the "porosity of the separator" refers to a value induced in terms of a volume ratio between density of resin as feed material and density of the separator as a final product.

The above-described nonwoven fabric separator may have a porosity of a value ranging from 50 to 90%. With the porosity of the value less than 50%, deterioration occurs in electrolyte-retaining ability and on the contrary, with the porosity of the value greater than 90%, reduction occurs in strength of the separator.

Though the separator, set forth above, may be basically impregnated with the electrolyte in an amount within an allowable range of a liquid-retaining capacity of the separator, the separator may be impregnated with the electrolyte at a rate exceeding the liquid-retaining capacity of the separator. This is because even with a bipolar type battery using an electrolyte layer composed of polymer gel electrolyte, the presence of insulation layers placed on respective cell outer peripheral edge portions of an electric power-generating element enables the electrolysis solution to be prevented from exuding from a solid electrolyte layer. Thus, the separator may be impregnated with the electrolyte within a range in which the electrolyte layer is able to retain liquid.

(6) Negative Electrode/Positive Electrode Ink Coating Step

In negative electrode/positive electrode ink coating step, either the positive electrode ink or the negative electrode ink is coated on the electrolyte ink layer that is formed in step (5) described above. This enables a positive electrode ink layer or a negative electrode ink layer to be formed. Hereinafter, description is made with reference to an example in which the negative electrode ink is coated on the electrolyte ink layer.

In particular, prepared negative electrode ink is coated on the electrolyte ink layer and, subsequently, dried to remove residual solvent.

Here, a method, in which the negative electrode ink is coated on the electrolyte ink layer, and a drying method may be applied in the same way as those of positive electrode coating step (4) set forth above. A drying condition may be determined depending on the coated negative electrode ink and, though not to be univocally defined, the drying may be usually carried out for one minute to eight hours, preferably three minutes to one hour, at temperatures of 20 to 200° C., preferably 40 to 150° C.

A thickness of the negative electrode layer (negative electrode active material layer), as a result of the drying set forth above, may be suitably adjusted depending on intended use of a battery and normally may fall in a value ranging from 5 to 50 μm. Also, with the present invention, the above-described thickness may be preferably determined from a viewpoint of the occurrence in variation in thickness of the negative electrode layer before and after thermal pressing.

(7) Thermal Pressing Step

Thermal pressing step includes step of thermally pressing a composite layer that is comprised of a positive electrode ink layer, an electrolyte ink layer and a negative electrode ink layer. With the present invention, the polymer electrolyte is contained in all of the positive electrode ink layer, the electrolyte ink layer and the negative electrode ink layer of the composite layer. For this reason, thermally pressing the composite layer as a whole after the formation thereof allows the polymer electrolytes in respective layers to be integrated to one another for thereby eliminating interfaces that would appear in respective interlayers (see FIG. 6). This allows ions to smoothly move across the respective interlayers, thereby achieving improvements in power density and safety of a battery as a whole. Additionally, it becomes possible to improve smoothness on a surface of the composite layer and uniformity in a thickness thereof after thermal pressing operation.

Here, a thermal pressing condition is not particularly limited provided that the above-described operational advantages can be developed, and the thermal pressing may be carried out at temperatures less than those in which the polymer electrolyte and the electrolyte salt are decomposed. In particular, the pressing temperature may preferably fall in a value equal to or less than 120° C.

A pressure under which the pressing is conducted may preferably fall in a value ranging from 50 to 500 kg/cm in terms of a linear pressure. Also, the thermal pressing may be conducted by locating collectors on both sides of one or plural composite layers.

Further, a method of thermal pressing may include a method passing the composite layer between upper and lower thermal press rollers to apply the composite layer with desired pressing temperatures and pressing pressures.

With the first embodiment according to the present invention, the collector may be coated with electrode inks in order and the thermal pressing may be conducted for each composite layer, comprised of the formed positive electrode ink layer, the electrolyte ink layer and the negative electrode ink layer, and then the plural composite layers are stacked to form a desired electric power-generating element. Or, the number of composite layers, required for structuring the electric power-generating element, is preliminarily stacked and, thereafter, these composite layers may be thermally pressed as a whole. In cases where difficulties are encountered in eliminating interfaces in the interlayers due to the occurrences of temperature difference or temperature distribution in an area between a central area and both terminal portions of the electric power-generating element, the thermal pressing may be preferably carried out in the former method described above. Even in this case, it may be preferable that the thermal pressing is not carried out for each one composite layer but may be conducted on a stack body composed of plural composite layers within a range not to cause a temperature difference and temperature distribution due to thermal pressing from a viewpoint of improvements in adhesiveness and productivity of the electric power-generating element. In the meanwhile, it may be preferable for the thermal pressing to be carried out in the latter method from a viewpoint of adhesiveness in the electric power-generating element as a whole and reduction in working man-hour.

Further, there is a difference in structure of the electrodes, to be located on both surfaces of one collector, between a battery of non-bipolar type and a battery of a bipolar type. Therefore, when forming a composite layer on a second stage after the formation of a composite layer on a first stage, an order in which the positive electrode ink and the negative electrode ink are coated differs between the non-bipolar type battery and the bipolar type battery. Accordingly, an order of steps (4) to (7) set forth above may be interchanged depending on a kind of batteries or objects on which the thermal pressing is conducted, for thereby forming a desired electric power-generating element.

Furthermore, with the first embodiment according to the present invention, there is no need for sequentially coating the respective inks on the collectors to form the composite layer like in steps (4) to (7) set forth above. As explained in Example set forth below, the positive electrode ink layer, the electrolyte ink layer and the negative electrode ink layer may be formed on separate substrates, respectively, to allow these substrates to be stacked in order before thermal pressing for thereby forming a composite layer.

(I) The positive electrode ink may be coated on a positive electrode collector and dried to form a positive electrode ink layer (positive electrode active material layer), and these are supposed to play a role as a positive electrode. Similarly, the electrolyte ink is coated on a glass substrate or a separator and dried to form an electrolyte ink layer (solid electrolyte layer). Likewise, the negative electrode ink is coated on a negative electrode collector and dried to form a negative electrode ink layer (negative electrode active material layer), and these are supposed to play a role as a negative electrode. Stacking these component elements in order enables one or more than two composite layers to be formed.

Or, (ii) the positive electrode ink may be coated on the positive electrode collector and dried to form the positive electrode ink layer, and these are supposed to play a role as the positive electrode. The electrolyte ink is coated on such a positive electrode ink layer and dried to form a portion of the electrolyte ink layer. Likewise, the negative electrode ink is coated on the negative electrode collector and dried to form the negative electrode ink layer, and these are supposed to play a role as the negative electrode. The electrolyte ink is coated on such a negative electrode ink layer and dried to form another portion of the electrolyte ink layer. Stacking these component elements in order also enables one or more than two composite layers to be formed.

As exemplified in steps (I) and (ii) set forth above, the first embodiment of the present invention is not particularly limited to the sequences of steps (4) to (7) set forth above. Also, with respect to this point, the same can be similarly said to the sequences of steps (6) to (9) of the second embodiment described below. Moreover, although step (I), set forth above, has been exemplary mentioned with reference to the substrate made of glass, substrates of any other materials may also be used provided that the formed electrolyte ink layer can be peeled off from the substrate in subsequent work.

Also, steps subsequent to step (4), described above, may be preferably executed under inert atmosphere, such as argon and nitrogen, from a viewpoint of preventing moisture from penetrating into a battery inside.

(8) Step of Forming Insulation Layer

A method of manufacturing a bipolar type battery may preferably include step of forming an insulation layer around surrounding areas of respective electrodes of an electric power-generating element (electrode stack body). This enables the battery to be prevented from the occurrence of short-circuiting due to the presence of contact between adjacent collectors inside the battery and the occurrence of non-alignment on edges of stacked electrodes at a slight degree, while blocking liquid junction, resulting from the electrolysis solution contained in the polymer gel electrolyte, from occurring. Under situations where the bipolar type battery is utilized as vehicle drive source or as an auxiliary power supply, probabilities occur wherein even if the use of a solid electrolyte completely prevents the occurrence of short-circuiting due to the electrolysis solution, the battery bears loads with vibrations or impacts over a long period of time. For this reason, from a viewpoint of a prolonged battery life, the provision of the insulation layers may be preferable in enhancing reliability and safety over the long period of time and in an ability of providing a large capacity battery with high quality.

A process of forming the insulation layer may include dipping a surrounding area of a unit cell forming an electric power-generating element in a precursor solution of insulation material in a given width, or pouring or impregnating the precursor solution of insulation material into the surrounding area of the unit cell. Thereafter, the precursor solution of insulation material is hardened to enable an insulation layer to be formed. Also, insulation material like a seal tape is applied to the surrounding area of the unit cell to form an insulation layer. In an alternative, insulation material, such as insulation paint, may be coated on an outer peripheral portion of a collector to form an insulation layer whereupon steps (4) to (7) are appropriately and repeatedly executed for thereby forming a positive electrode ink layer, an electrolyte ink layer and a negative electrode ink layer inside the insulation layer. That is, the present step may not be necessarily executed subsequent to steps (4) to (7), set forth above, and depending on an embodiment in which the insulation layer is formed, step of forming the insulation layer may be possible to be executed prior to or in mid-course of these steps.

The insulation material for use in the formation of the insulation layer, set forth above, may be of the type that has insulation property, sealing property enabled to overcome the dropout of the solid electrolyte, sealing property enabled to overcome the permeation of moisture from outside and heat-resistance under operating temperatures of a battery. Examples of the insulation material may include epoxy resin, rubber, polyethylene, polypropylene and polyimide and from a viewpoint of corrosion resistance, chemical proof, an ease of fabrication and economical efficiency, epoxy resin may be preferred.

(9) Step of Connecting Terminal Plates, Electrode Leads and Electrode Tabs (Terminals)

During step of connecting tabs, electrode tabs are electrically connected to the electrodes of the electric power-generating element.

With the non-bipolar type battery, electrode tabs are electrically connected to the electrodes of the electric power-generating element. Also, when needed, positive electrode lead and negative electrode lead may be connected to the collectors of both the outermost layers of the electric power-generating element. Therefore, the positive electrode tab and the negative electrode tab may be directly connected between respective electrodes or connected between the positive electrode and negative electrode leads. In addition, the electrode tab may be formed of an elongated portion of the collector.

Further, with the bipolar type battery, the electrode tabs are connected to the outermost layers of the electric power-generating element. Also, depending on needs, a positive electrode terminal plate and a negative electrode terminal plate are placed on and connected to the collectors on both the outermost layers, respectively. Furthermore, the positive electrode and negative electrode leads may be connected to the collectors on the outermost layers or the positive electrode terminal plate and the negative electrode terminal plate. Accordingly, the positive electrode tab and the negative electrode tab may be connected to upper areas of the collectors on both the outermost layers of an electrode stack; the positive electrode tab and the negative electrode tab may be connected to upper areas of the positive electrode plate and the negative electrode plate; the positive electrode tab and the negative electrode tab may be connected to the positive electrode and negative electrode leads; or portions of the collectors on the outermost layers may be elongated to form the positive electrode tab and the negative electrode tab, respectively.

A method of connecting the terminal plates, the leads and the electrode tabs may appropriately utilize ultrasonic welding with low welding temperatures.

Of the positive electrode tab and the negative electrode tab, the portions to be extracted from a battery sheath material to the battery outside may be preferably covered with a heat shrinkable tube with heat resistance and insulation property. This may be similarly applied to the electrode leads and voltage detection tabs described below.

Further, examples of materials of the electrode tab for use in the present invention may include aluminum, copper, titanium, nickel, stainless steel (SUS) and alloy of these metals. The positive electrode tab and the negative electrode tab may be made of the same material or different materials. Moreover, the positive electrode tab and the negative electrode tab may be formed in stack structures, respectively, each made of different metals in multiple layers.

A thickness of the electrode tab may be suitably determined depending on intended use of a battery. Preferably, the thickness of the electrode tab may be desired to be thin from a viewpoint of increasing gas-tightness or waterproof property of a portion sandwiched between sealed portions of an outer sheath and from the viewpoint of reduction in electric resistance, an increased thickness may be preferred. Thus, the thickness of the electrode tab usually may fall in a value ranging from 1 to 50 µm and, preferably, in a value ranging from 1 to 100 µm.

Further, as for a way of extracting the electrode tab to the battery outside, the positive electrode tab and the negative electrode tab may be separately extracted from opposing sides, respectively. In an alternative, the positive electrode tab and the negative electrode tab may be separately extracted from the same side. In addition, the positive electrode tab and the negative electrode tab may be separately extracted from adjacent sides, respectively. In order to connect a plurality of these unit cells into a battery, it may be preferred that in view of wirings, the positive electrode tab and the negative electrode tab may be separately extracted from the opposing sides, respectively. Also, a surface of tab metal may be formed with a high resistance layer if desired.

Furthermore, examples of materials for the positive electrode and negative electrode leads, to be used depending on needs, may include aluminum, copper, titanium, nickel, stainless steel (SUS) and alloy of these metals. The positive electrode and negative electrode leads may be made of the same material or different materials. Moreover, the positive electrode and negative electrode leads may be formed in stack structures, respectively, each made of different metals in multiple layers. Also, due to a probability in which the positive electrode and negative electrode leads are made closer to or held in close contact with the battery sheath member, a high resistance layer may be suitably provided on a surface of the electrode lead at a desired area thereof like in the electrode tab if desired.

The positive electrode terminal plate and the negative electrode terminal plate may be used depending on needs. In case of a lithium ion battery of a bipolar type, electrode terminals may be directly extracted from the collectors at the outermost layers with no need for use of the positive electrode and negative electrode terminal plates.

When using the positive electrode and negative electrode terminal plates, these terminal plates may have a function as terminals and may be thin as small as possible from the viewpoint of a thin-shape configuration. However, since any of the collectors, the electrode active material layer and the electrolyte layer, which are stacked in structure, has less mechanical strength, the terminal plates may be designed to have strengths adequate for sandwiching these components from the both sides to support the same. Additionally, from the viewpoint of suppressing internal resistance from the electrode terminal plate to the associated electrode tab, the thickness of each of the positive electrode and negative electrode terminal plates may usually and preferably fall in a value of approximately 0.1 to 2 mm.

As for materials of the positive electrode and negative electrode terminal plates, metals such as aluminum, copper, titanium, nickel, stainless steel (SUS) and alloy of these metals may be utilized.

The positive electrode and negative electrode terminal plates are made of the same material or different materials. In addition, the positive electrode and negative electrode terminal plate may be formed in stack structures, respectively, each made of different metals in multiple layers. Also, due to a probability in which the positive electrode and negative electrode terminal plates are made closer to or held in close contact with the battery sheath member, a high resistance layer may be suitably provided on a surface of each electrode terminal plate at a desired area thereof like in the electrode tab if desired.

(10) Step of Connecting Voltage Detection Tab

With the bipolar type battery, it is preferable to provide step of connecting voltage detection tabs to respective collectors for detecting a voltage for each cell of an electric power-generating element. Preferably, the voltage detection tabs may be desirably connected to the respective collectors such that when the voltage for each cell of the electric power-generating element is detected and the cell is found to remain under an overcharged status or an over-discharged status, the voltage of the cell is bypassed. Further, it may be preferable for the detection tabs to be extracted to the battery outside to allow the extracted detection tabs to be connected to a voltage detection and bypass control circuit. This enables the minimization in a degree of deterioration in battery performance resulting from the occurrence of irregular capacities of the cells inside the battery, thereby increasing battery life.

The voltage detection tabs have one ends connected to the collectors of the cells and the other ends extracted to the battery outside to allow these tabs to be connected to the voltage detection and bypass control circuit. This enables the suppression in deterioration of battery performance resulting from the occurrence of irregular capacities of the cells of the battery inside in which several tens to hundred and several tens cells are accommodated in order to enhance a high voltage needed for a vehicle power supply, resulting in a capability of increasing battery life. Particularly, when using the bipolar type battery as a vehicular power source, reliability and stability are required and, so, there is a need for monitoring whether the respective bipolar type batteries or the respective cells are normally operating. For this reason, it is preferable to monitor all the battery voltages and the cell voltages inside the bipolar type battery at all times to enable the detection of a deteriorated battery or a deteriorated cell in the bipolar type battery.

Further, it is convenient for the voltage detection tabs and the positive electrode tab and the negative electrode tab, set forth above, to be extracted from different sides of the battery for the sake of convenience in wirings and in view of enhancing gas-tightness in a sealed area.

In addition, since the voltage detection tab is applied with only the voltage of each cell, no need arises for forming a high resistance layer as required in the electrode tab.

The voltage detection tab may include the same materials as those of the above-described electrode tab. These include aluminum, copper, titanium, nickel, stainless steel (SUS) and alloy of these metals. Materials of the respective voltage detection tabs may preferably include the same materials but may employ different materials. Moreover, the voltage detection tab may be formed in a stack structure composed of multi-layers made of different metals.

(11) Packing Step

Finally, as for packing step, the electric power-generating element is entirely sealed with a battery sheath member or a battery casing in view of ensuring water-proof and sealing capability of the battery while additionally achieving weight saving of the battery for thereby preventing the electric power-generating element from impacts, applied from an outside in use, and environmental deterioration. This enables a desired solid electrolyte battery to be completed. During sealing step, the positive electrode tab and the negative electrode tab are partially extracted outside the battery.

Materials of the battery sheath member may preferably include polymer and metal composite film in which a metallic layer is covered with an insulator formed of polymer film.

Examples of the polymer and metal composite film may include a metallic film made of aluminum, stainless steel, nickel and copper whose both surfaces are covered with an insulator of the polymer film, preferably heat resistant insulator. As for the insulator, there are polyethylene tetraphthalate (heat resistant insulation film), nylon film (heat resistant insulation film), polyethylene film (heat resistant insulation film) and polypropylene film (thermally fusing insulation film) and these materials may be applied to a front surface side and a tab side depending on intended use.

As for the above-described metallic layer, a soft material is required to be excellent in heat resistant property, high barrier capability against oxygen, steam and light from an outside rather than insulating property and, further, a strength against bending rather than insulating property against a high voltage. Therefore, as for the material of the metallic layer, aluminum is preferably employed. A thickness of the metallic layer may be sufficed to fall in a value, to adequately satisfy the above-described characteristics, in the order of 1 to 100 μm and more preferably in a range of 5 to 50 μm.

The insulator on the above-described front surface side has no need to have thermally fusing property but needs to have external insulation property, weathering resistance, anti-scratch ability, barrier capability against oxygen and steam penetrating from the outside, and heat resistance. Therefore, desired materials may be selected from polyethylene tetraphthalate and nylon film. Further, a thickness of the insulator on the front surface side may have a value sufficed for developing the above-described characteristics and fall in a value of 1 to 50 μm and, more preferably, in a range of 5 to 30 μm.

The insulator on the tab side needs to have internal insulation property, thermally fusing property, chemical proof, barrier capability against oxygen, steam and, further, gas resulting from overcharging, and heat resistance. Therefore, desired materials may be selected from polyethylene film and polypropylene film. Further, a thickness of the insulator on the tab side may have a value sufficed for developing the above-described characteristics and fall in a value of 1 to 100 μm and, more preferably, in a range of 5 to 50 μm.

An overall thickness of the polymer and metal composite film is not particularly limited, provided that the above-described function required for the battery sheath member is exhibited and may normally fall in a value of 20 to 150 μm and, more preferably, in a range of 50 to 120 μm.

Further, the insulators on the front surface side and the tab side may be formed in stack structures, respectively, each composed of multiple layers made of different materials. Further, when thermally fusing upper and lower two sheets of the polymer and metal composite film in use, materials of respective layers inside the two sheets of the polymer and metal composite film may be formed of the same materials or different materials.

With the present invention, the use of the polymer and metal composite films allows portions of or entire areas of peripheries of the films to be joined by thermal fusion to provide sealed portions in which a battery stack body is accommodated gas-tight in structure. In this case, a structure may be provided such that the above-described positive electrode tabs, negative electrode tabs and voltage detection tabs are sandwiched between the sealed portions to ensure insulated conditions under which extracted portions at distal ends of the positive electrode tab, the negative electrode tab and the voltage detection tab are exposed to the outside of the battery sheath member. Also, the use of the polymer and metal composite film excellent in thermal conductivity is preferable because heat developed by a heat source of an automobile is efficiently transferred to the battery inside to immediately heat the same to a battery operating temperature.

Next, a second embodiment according to the present invention is described in line with a sequence of preferable steps (1) to (9) set forth above.

(1) Step of Preparing Positive Electrode Polymer Particles

Step of preparing positive electrode polymer particles may include first adding positive electrode active material, conductive material, polymer electrolyte and solvent at suitable ratios, respectively, and stirring the resulting mixture with a suitable stirring means, such as a homomixer, to a uniform degree for thereby preparing mixture slurry.

A viscosity of the mixture slurry, set forth above, may be suitably regulated by adjusting the amount of solvent to be added so as to provide a viscosity suited for granulating step that is described below.

In order to increase electric conductivity of the positive electrode active material, substantially whole surfaces of the positive electrode active material particles need to be covered with conductive fine particles. Therefore, prior to preparing the above-described mixture slurry, a positive electrode active material, a conductive material and, if desired, a binder may be appropriately mixed to allow conductive fine particles to be coupled to the surfaces of the positive electrode active material particles. Moreover, the mixture slurry, set forth above, may arbitrarily include other components, such as electrolyte salt, polymerization initiator and a binder and, like in step set forth above, these components may be appropriately added and stirred to be mixed for preparing mixture slurry.

Various components of the positive electrode active material, the conductive material, the polymer electrolyte, the electrolyte salt, the polymerization initiator, the binder and the solvent available for preparing the mixture slurry, set forth above, may preferably include the same materials as those described with reference to step (1) of the first embodiment according to the present invention.

Then, conducting appropriate granulating step allows the mixture slurry to be granulated, thereby preparing positive electrode polymer particles with a desired particle size. FIG. 1 typically represents the resulting positive electrode polymer particles 13. As shown in FIG. 1, conductive materials (in the form of particles) 5 are coupled to outer peripheries of respective positive electrode active materials (in the form of particles) 3 by means of binders (not shown). The positive electrode active materials 3, the conductive materials 5 and other associated components are substantially uniformly dispersed in the polymer electrolyte 7. The same can be said for negative electrode polymer particles and electrolyte particles (see FIGS. 2B and C).

Here, step of granulating the above-described positive electrode active material particles may include a spray drying method such as an atomizer-spray drying method. More particularly, such a method includes granulating step in which a spray nozzle, such as two fluid nozzles, four fluid nozzles and pressure nozzle, is used for spraying the mixture slurry in blasts of hot air to prepare dried powder in a short period of time.

Further, a mean particle diameter of the positive electrode polymer particles resulting from the granulation may have a value suited for subsequent coating or thermal pressing steps, which are described below, and fall in a value of 0.1 to 20 μm and, more preferably, in a range of 0.1 to 1 μm. Laser analysis and SEM can measure the mean particle diameter.

(2) Step of Preparing Negative Electrode Polymer Particles

Step of preparing negative electrode polymer particles includes adding negative electrode active material, polymer electrolyte that is raw polymer of solid electrolyte, and solvent in respective appropriate amounts and mixing these components by the use of suitable stirring means, such as a homomixer, to combine, thereby preparing mixture slurry.

A viscosity of the mixture slurry, set forth above, may be regulated by adjusting the amount of solvent to be added to provide a viscosity suited for subsequent granulating step that will be described below.

The above-described mixture slurry may contain other components, such as conductive material, electrolyte salt, polymerization initiator and binder in respective arbitrary amounts. These other components can be added in respective appropriate amounts in the same manner as set forth above, stirred and mixed for preparing mixture slurry.

For materials with low electric conductivity to be used as the negative electrode active material, there is a need for substantially entire areas of surfaces of the negative electrode active material particles to be covered with conductive material fine particles in order to increase electrical conductivity of the negative electrode active material. Therefore, prior to preparing the above-described mixture slurry, the negative electrode active material and the conductive material and, if desired, the binder may be mixed at appropriate rates, thereby preparing particles composed of the negative electrode active material particles with the surfaces thereof covered with the fine particles of the conductive material.

The negative electrode active material, the conductive material, the polymer electrolyte, the electrolyte salt, the polymerization initiator, the binder and the solvent available for preparing the mixture slurry, set forth above, may preferably include the same components as those described with reference to step (2) of the first embodiment according to the present invention.

Then, conducting appropriate granulating step allows the mixture slurry to be granulated, thereby preparing negative electrode polymer particles with a desired particle size. The method of granulating the negative electrode polymer particles may include the same step as that described in connection with the granulating method executed for the positive electrode polymer particles in step (1) described above.

Further, a mean particle diameter of the negative electrode polymer particles resulting from the granulation may have a value suited for subsequent coating or thermal pressing steps and fall in a value of 0.1 to 20 μm and, more preferably, in a range of 0.1 to 1 μm.

(3) Step of Preparing Positive Electrode Particle Ink

Step of preparing positive electrode particle ink includes dispersing positive electrode polymer particles, prepared in step (1) set forth above, in a solvent to prepare positive electrode particle ink.

In particular, adding the positive electrode polymer particles in the solvent and stirring these components by the use of a suitable stirring means, such as a homomixer, enables the preparation of positive electrode particle ink with a desired viscosity. In addition, suitable dispersion stabilizer may be added in an extremely small amount if desired within a range unavailable to adversely affect the operational effects of the present invention and therefore battery performance. FIG. 2A typically represents an appearance of positive electrode particle ink prepared in the present step. As shown in FIG. 2A, positive electrode particle ink 11 is comprised of a solvent 12 and positive electrode polymer particles 13 dispersed in the solvent 12 in a substantially homogeneous manner.

The solvent 12 may include the same solvent as that described in conjunction with step (1) of the second embodiment and such a solvent causes the positive electrode polymer particles to dissolve. For this reason, it is preferred to select the solvent by which the polymer particles are unable to dissolve or insoluble and able to allow the polymer particles to be suitably dispersed. In particular, such a compound may include carbon tetrachloride.

A viscosity of the positive electrode particle ink, set forth above, may be regulated by adjusting the amount of a solvent to be added to provide a viscosity suited for step of coating the positive electrode particle ink as described later.

(4) Step of Preparing Negative Electrode Particle Ink

Step of preparing negative electrode particle ink includes dispersing negative electrode polymer particles, prepared in step (2) set forth above, in a solvent to prepare negative electrode particle ink.

In particular, adding the negative electrode polymer particles in the solvent and stirring these components by the use of a suitable stirring means, such as a homomixer, enables the preparation of negative electrode particle ink with a desired viscosity. In addition, suitable dispersion stabilizer may be added in an extremely small amount if desired within a range unavailable to adversely affect the operational effects of the present invention and therefore battery performance.

FIG. 2C typically represents an appearance of negative electrode particle ink prepared in the present step. As shown in FIG. 2C, negative electrode particle ink 17 is comprised of a solvent 18 and negative electrode polymer particles 19 dispersed in the solvent 18 in a substantially homogeneous manner.

The solvent 18 may include the same solvent as that described in conjunction with step (1) of the second embodiment and such a solvent causes the negative electrode polymer particles to dissolve. For this reason, it is preferred to select the solvent by which the polymer particles are unable to dissolve or insoluble and able to allow the polymer particles to be suitably dispersed. In particular, such a compound may include carbon tetrachloride.

A viscosity of the resulting negative electrode particle ink may be regulated by adjusting the amount of a solvent to be added to provide a viscosity suited for a method of coating the negative electrode particle ink as described later.

(5) Step of Preparing Electrolyte Ink

The present step is conducted for preparing electrolyte ink that includes polymer electrolyte and a solvent and desired electrolyte ink can be prepared in the same manner as step of preparing electrolyte ink in the above-described step (3) of the first embodiment.

In the second embodiment, electrolyte particle ink that contains the polymer electrolyte grained and dispersed in the solvent can be applied. Hereinafter, the present step is described below with reference to points that differ from the first embodiment.

In step of preparing electrolyte particle ink, first, the polymer electrolyte is grained into particles.

During such graining step, the slurry preparation method and the granulating method in the above-described step (1) of the second embodiment may be applied.

In particular, adding polymer electrolyte, which is raw polymer of a solid electrolyte, and a solvent in respective appropriate amounts and mixing these components by stirring with the use of suitable stirring means, such as a homomixer, to be uniform in mixture allows a mixture slurry to be prepared.

By adjusting the amount of solvent to be added, a viscosity of the mixture slurry may be suitably regulated to provide a viscosity suited for subsequent granulating step that will be described later.

The above-described mixture slurry may contain other components, such as electrolyte salt and polymerization initiator in respective arbitrary amounts. These other components can be added in respective appropriate amounts in the same manner as set forth above, stirred and mixed for preparation of the mixture slurry.

The materials to be used for preparing the mixture slurry, set forth above, may include the same components, such as the polymer electrolyte, the electrolyte salt, the polymerization initiator and the binder, as those described with reference to step (1) of the first embodiment.

Then, conducting appropriate granulating step allows the mixture slurry to be granulated, thereby preparing electrolyte polymer particles with a desired particle size. The method of granulating the electrolyte particles may include the same method as that described in connection with the above-described granulating method in step (1) of the second embodiment.

Further, a mean particle diameter of the electrolyte particles resulting from the granulation may have a value suited for subsequent coating or thermal pressing steps and fall in a value of 0.1 to 20 μm and, more preferably, in a range of 0.1 to 1 μm. Laser analysis and SEM can measure the mean particle diameter.

Next, dispersing the electrolyte polymer particles, resulting from graining step, in a solvent allows the preparation of electrolyte particle ink. As for a method of preparing such particle ink, it may be possible to apply the particle ink preparing method in steps (3) and (4) set forth above with reference to the second embodiment.

In particular, adding the electrolyte particles in the solvent and stirring these components by the use of a suitable stirring means, such as a homomixer, enables the preparation of electrolyte particle ink with a desired viscosity. In addition, suitable dispersion stabilizer may be added in an extremely small amount, if desired, within a range unavailable to adversely affect the operational effects of the present invention and therefore battery performance.

Figure 2B:
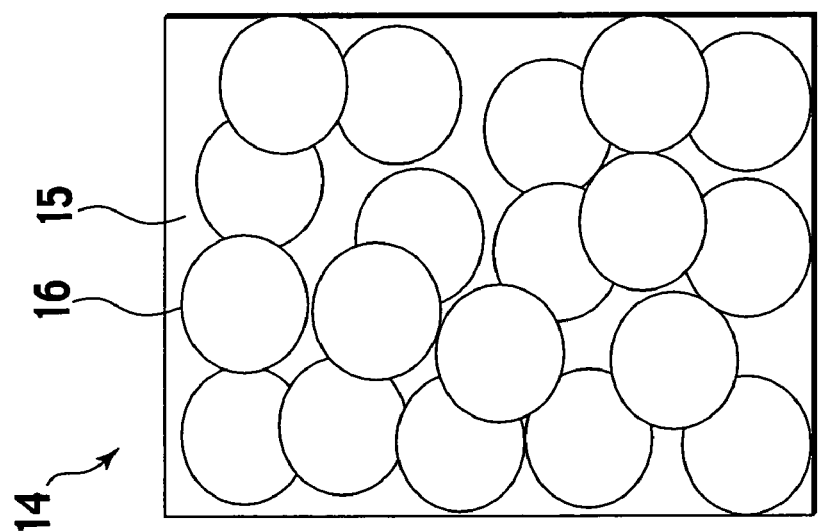
FIG. 2B is a schematic view showing electrolyte particle ink.
Figure 2A:
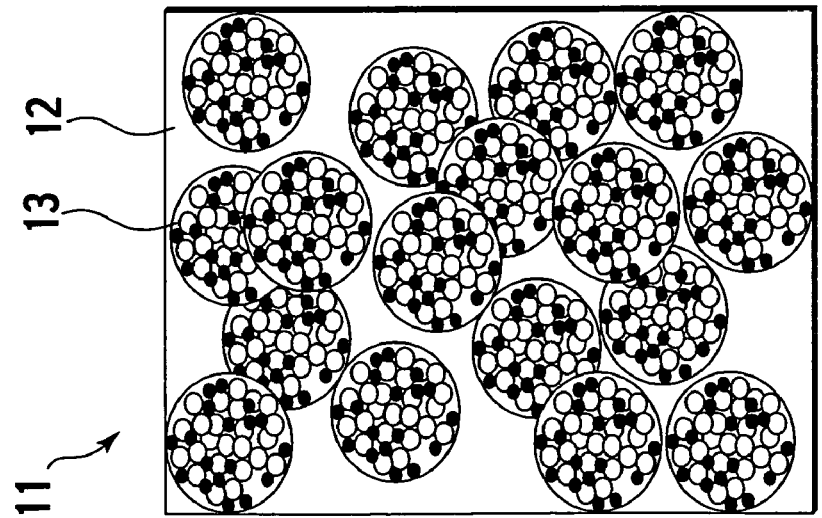
FIG. 2A is a schematic view showing positive electrode particle ink.

FIG. 2B typically represents an appearance of electrolyte particle ink prepared in the present step. As shown in FIG. 2B, electrolyte particle ink 14 is comprised of a solvent 15 and electrolyte particles 16 dispersed in the solvent 15 in a substantially homogeneous manner.

The solvent 15 may include the same solvent as that described in conjunction with step (1) of the second embodiment and such a solvent causes the electrolyte particles to dissolve. For this reason, it is preferred to select the solvent by which the polymer particles are unable to dissolve or insoluble and able allow the polymer particles to be suitably dispersed. In particular, such a compound may include carbon tetrachloride.

A viscosity of the resulting electrolyte particle ink may be regulated by adjusting the amount of a solvent to provide a viscosity suited for a method of coating the electrolyte particle ink as described later.

(6) Step of Coating Positive Electrode Particle Ink/Negative Electrode Particle Ink In the present step, one of positive electrode particle ink or negative electrode particle ink is coated on a collector. This enables a positive electrode particle ink layer (positive electrode active material layer) or a negative electrode particle ink layer (negative electrode active material layer) to be formed.

When conducting the present step, it may be possible to widely apply the same ink coating step and drying step as well as component materials as those described in conjunction with the above-described step (4) of the first embodiment.

The following step is described in conjunction with an exemplary case wherein the positive electrode particle ink, the electrolyte particle ink and the negative electrode particle ink are coated in this order.

FIG. 3 typically represents one mode of the present step to show an appearance of a structure resulting after positive electrode particle ink is coated on a collector. As shown in FIG. 3, coating the positive electrode particle ink 11, which contains the positive electrode polymer particles 13 dispersed in the solvent 12, on a collector 21 enables the formation of a positive electrode particle ink layer 22a under a non-dried condition. Drying this layer enables the formation of a positive electrode particle ink layer 22 as shown in FIG. 4 that will be described later.

(7) Step of Coating Electrolyte Ink

In the present step, electrolyte ink is coated on the positive electrode particle ink layer or the negative electrode particle ink layer that are formed by the coating. This enables an electrolyte ink layer (electrolyte layer) to be formed.

When conducting the present step, it may be possible to apply the same ink coating step and drying step as those described in conjunction with the above-described step (5) of the first embodiment. Also, even when using the electrolyte particle ink as the electrolyte ink, it may be possible to apply the same ink coating step and drying step as those described in conjunction with the above-described step (5) of the first embodiment.

FIG. 4 typically represents one mode of the present step to show an appearance of a structure resulting after the electrolyte particle ink is coated on the positive electrode particle layer. As shown in FIG. 4, the electrolyte particle ink 14, which contains the electrolyte particles 16 that is dispersed in the solvent 15, is coated on the positive electrode particle layer 22 enables the formation of an electrolyte particle ink layer 23a under a non-dried condition. Drying this layer enables the formation of an electrolyte particle ink layer 23 as shown in FIG. 5 that will be described later. The electrolyte particle ink layer 23 may be preferably coated in an area with a size slightly larger than that of the positive electrode particle ink layer 22 like in the first embodiment.

(8) Step of Coating Negative Electrode Particle Ink/Positive Electrode Particle Ink In present step, the other one of positive electrode particle ink and negative electrode particle ink is coated on the electrolyte particle ink layer resulting from the coating. This allows a negative electrode particle ink layer or a positive electrode particle ink layer to be formed.

When conducting the present step, it may be possible to apply the same ink coating step and drying step as those described in conjunction with the above-described step (6) of the first embodiment.

FIG. 5 typically represents one mode of the present step to show an appearance of a structure resulting after the negative electrode particle ink is coated on the electrolyte particle ink layer. As shown in FIG. 5, coating the negative electrode particle ink 17, which contains the negative electrode polymer particles 19 dispersed in the solvent 18, on the electrolyte particle ink layer 23 enables the formation of a negative electrode particle ink layer 24a under a non-dried condition. Drying this layer enables a negative electrode particle ink layer 24 to be formed.

(9) Step of Thermally Pressing

In present step, thermal pressing is conducted to form a composite layer that is comprised of the positive electrode particle ink layer, the electrolyte ink layer and the negative electrode particle ink layer, all which result from the coating steps. With the present invention, the polymer electrolyte is contained in whole of the positive electrode particle ink layer, the electrolyte ink layer and the negative electrode particle ink layer of the composite layer. In particular, the solid polymer particles of the respective inks contain the polymer electrolyte. Therefore, by thermally pressing a composite layer as a whole after the formation thereof, the polymer electrolytes in respective interlayer areas are integrated, thereby eliminating the interfaces present in the respective interlayer areas (see FIG. 6). This allows smoothly transfer of ions across the interlayer areas, resulting in improvements in power output density and safety of a battery as a whole. Additionally, smoothing capability of a surface of the composite layer and uniformity in a thickness thereof after thermally pressing can be improved.

The present step may include the same thermal pressing step as that described in connection with the above-described step (7) of the first embodiment.

FIG. 6 typically represents one mode of the present step to show an appearance of a structure resulting after the composite layer is thermally pressed. As shown in FIG. 6, by causing the composite layer 25, formed on the collector 21, to be subjected to appropriate thermal pressing, that is, step to run through thermal press rolls, the respective interfaces are eliminated from the positive electrode particle ink layer, the electrolyte particle ink layer and the negative electrode particle ink layer that form the composite layer 25, thereby causing these layers to be integrated. Additionally, the respective interfaces in the respective interlayers and in the polymer particles of the respective interlayers disappear, enabling the particles to be integrated. That is, the particles have no trace of their original forms or configurations. This enables the second embodiment, which uses ink formed of polymer electrolyte grained and dispersed in the solvent, to provide further improvement in load characteristic of a battery, particularly load characteristic at high power output of the battery, than that achieved by the first embodiment which uses ink with non-grained polymer electrolyte. Though such a phenomenon is not adequately figured out at the present stage, it is anticipated that the presence of contact between the polymer particles provides more favorable effect in eliminating the interfaces among the particles, when applied with thermal pressing, than that achieved in a planar surface. Also, as used herein, the term "planar surface" refers to a surface of each ink layer in the exemplary case of the first embodiment. That is, this is because the surface of each ink layer, resulting from respective inks prepared, coated and formed without graining step, is finished in a relatively plane condition.

Even with the second embodiment, the composite layers are thermally pressed for each composite layer, composed of the positive electrode particle ink layer, the electrolyte particle ink layer and the negative electrode particle ink layer, and the composite layers are stacked into a desired electric power-generating element. In an alternative, the desired number of composite layers, required for structuring an electric power-generating element, is preliminarily stacked and then, these composite layers may be thermally pressed as a whole. Under circumstances where due to temperature difference or temperature distribution resulting from the thermal pressing between a central area and both distal ends of the electric power-generating element, difficulties are encountered in eliminating the interfaces from the interlayers, the former method may be preferably executed. Even under such circumstances, it may be preferable in view of improvement in productivity that no thermal pressing is executed for each composite layer but after stacking a plurality of composite layers, the thermal pressing is executed on a stack of the plural composite layers. In the meanwhile, if the temperature difference or the temperature distribution are hard to occur between the central area and the both distal end portions of the electric power-generating element, when applied with thermal pressing, with a capability of adequately eliminating the interfaces from the interlayers, the latter method may be particularly preferred in view of reduction in work man-hour.

Further, a difference exists in structure of the electrodes to be formed on both surfaces of one collector between the non-bipolar type battery and the bipolar type battery. For this reason, when forming a composite layer on a second stage after a composite layer is formed on a first stage, an order in which the positive electrode particle ink and the negative electrode particle ink are coated differs between the non-bipolar type battery and the bipolar type battery. Therefore, the order of steps (6) to (9), set forth above, to be executed may be suitably interchanged a number of necessary repeated times depending on a kind of batteries or objects to be thermally pressed such that a desired electric power-generating element is formed.

Furthermore, when fabricating the electric power-generating element by executing operations subsequent to step (6) set forth above, such operations may be preferably executed under inert atmosphere, such as argon or nitrogen, from a standpoint of precluding moisture from entering a battery inside.

Even with the second embodiment of the present invention, it is featured that a fundamental structure of the electric power-generating element is fabricated through operations of steps (1) to (9) set forth above, and nothing is limited to other requirements. Accordingly, subsequent battery assembling steps may be carried out in the same manner as those of step (8) for forming insulation layers, step (9) of connecting terminal plates, electric leads and electrode tabs, step (10) for connecting voltage detection tabs and step (11) for packing.

Also, the first and second embodiments are fundamentally identical to one another except for that the second embodiment uses ink composed of the polymer electrolyte grained into particles and dispersed in the solvent whereas the first embodiment employs ink with no polymer electrolyte being grained. Therefore, unless otherwise particularly described that similar description is omitted, it should be appreciated that the requirements described with reference to only one embodiment may be similarly applied to the other embodiment.

Now, description is made of a solid electrolyte lithium ion secondary battery of non-bipolar type and a solid electrolyte lithium ion secondary battery of bipolar type resulting from the manufacturing method of the present invention.

Figure 7:
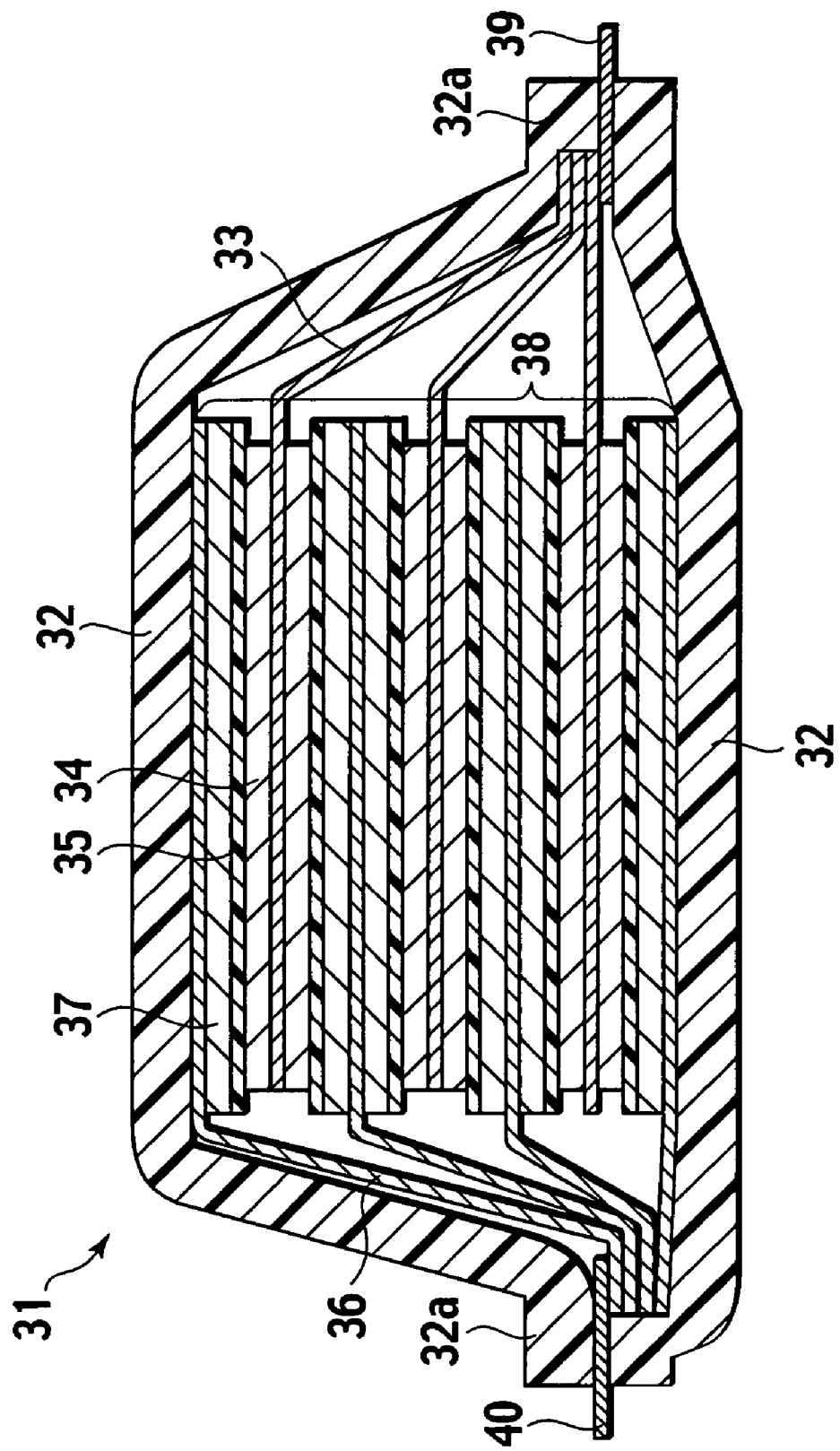
FIG. 7 is a schematic cross-sectional view illustrating a solid electrolyte battery of non-bipolar type.

FIG. 7 shows a flat solid electrolyte lithium ion secondary battery of non-bipolar type. The solid electrolyte lithium ion secondary battery 31 has a structure wherein a battery sheath member 32 is formed of a laminate film, made of polymer-metal composite material, whose entire peripheral portions (thermally welded portions) 32a are joined by thermal fusion to accommodate an electric power-generating element 38 in a gas-tight sealed condition. The electric power-generating element 38 includes a plurality of stacks each comprised of a positive electrode, composed of a positive electrode collector 33 with both surfaces thereof formed with positive electrode active material layers 34, a solid electrolyte layer 35 and a negative electrode composed of a negative electrode collector 36 with both surfaces thereof formed with negative electrode active material layers 37. However, the electric power-generating element 38 takes the form of a structure wherein the negative electrodes on the lowermost and uppermost layers of the electric power-generating element 38 include the negative electrode collectors 36, respectively, each of which has one surface formed with a negative electrode active material layer 37. Further, one distal ends of a positive electrode tab 39 and a negative electrode tab 40 are conducted to the respective electrode plates and mounted to the positive electrode collector 33 and the negative electrode collector 36 of the electrode plates, respectively, by ultrasonic welding or resistance welding. Furthermore, the other distal ends of the positive electrode tab 39 and the negative electrode tab 40 are structured such that each tab is sandwiched between joined portions (thermally fused portions) welded by the above-described thermal fusion to allow a portion of the tab to be exposed to the outside of the above-described battery sheath member 32. With the present invention, the positive electrode active material layer 34 corresponds to the positive electrode ink layer or the positive electrode particle ink layer, which are set forth above. The solid electrolyte layer 35 corresponds to the electrolyte ink layer or the electrolyte particle ink layer, which are set forth above. The negative electrode active material layer 37 corresponds to the negative electrode ink layer or the negative electrode particle ink layer, which are set forth above. In this respect, for a convenience of describing a fundamental structure of the battery, FIG. 7 shows interfaces of the above-described positive electrode active material layer 34, solid electrolyte layer 35 and negative electrode active material layer 37 for descriptive purposes. But, by implementing the manufacturing method of the present invention, the interfaces of these layers disappear, resulting in the formation of merely the composite layer 25 in which these layers are integrated as shown in FIG. 6.

FIG. 8 shows a solid electrolyte lithium ion secondary battery of a bipolar type (bipolar type battery). With the bipolar type battery 41, a positive electrode active material layer 43 and a negative electrode active material layer 44 are placed in opposition to one another between which a solid electrolyte layer 46 is sandwiched. Each of bipolar electrodes 45 is comprised of a positive electrode active material layer 43 formed on one surface of a collector 42, composed of one or more than two sheets, and a negative electrode active material layer 44 formed on the other surface of the collector 42. That is, the bipolar type battery 41 takes the form of a structure that is comprised of an electric power-generating element 47 that includes a plurality of bipolar electrodes 45 stacked via the solid electrolyte layers 46. Also, the bipolar type battery 41 does not need to take the bipolar electrode structure on the uppermost electrode 45*b* and the lowermost electrode 45*a* of the electric power-generating elements 47 composed of stacks of the plural bipolar electrodes. That is, it may be structured such that the positive electrode active material layer 43 or the negative electrode active material layer 44 is placed on the collector 42 only at one necessary surface thereof. Also, with the bipolar type battery 41, positive electrode and negative electrode tabs 48, 49 are connected to the collectors 42, respectively. The number of bipolar electrodes 45 to be stacked is adjusted depending on a desired voltage output. Moreover, with the bipolar type battery 41, if a sufficient power output is enhanced even if the battery is reduced in thickness as small as possible, the number of stacks of the bipolar electrodes 45 may be decreased. Additionally, in order to prevent the bipolar type battery 41 from impacts from the outside in use while precluding environmental deterioration, also, the bipolar type battery 41 may take a structure wherein the electric power-generating element 47 is sealed within a battery sheath member 50 under reduced pressure and the electrode tabs 48, 49 are extracted to the outside of the battery sheath member 50.

It can be said that a fundamental structure of the electric power-generating element 47 of the bipolar type battery 41 is formed of a plurality of stacked unit cell layers that are connected in series. Since the solid electrolyte lithium ion secondary battery of the bipolar type is fundamentally identical to the solid electrolyte lithium ion secondary battery of the non-bipolar type, set forth above, except for the electrode structure, respective component elements are collectively described below.

(Collector)

Materials and structure of the collector are of the types already described above and, so, description of the same is herein omitted.

A thickness of the collector is not particularly limited and may normally fall in a value ranging from 1 to 100 μm.

(Positive Electrode Active Material Layer and Negative Electrode Active Material Layer)

The positive electrode active material layer and the negative electrode active material layer are made of the same components as those described above and, hence, description of these materials is herein omitted.

A thickness of the positive electrode active material layer is of a type that is not particularly limited but should be determined in the light of intended use (with a high regard for power output and energy) and ion conductivity. The positive electrode active material layer has a general thickness of approximately 1 to 500 μm and, though the thickness within such a range is available to be utilized in the present invention, it may be preferable for a thickness to lie in a range of 5 to 50 μm. Here, this thickness corresponds to a value resulting from drying step prior to thermal pressing step. This is because the present invention allows the interfaces in the respective interlayers to be eliminated with a resultant difficulty in correctly measuring a thickness of the relevant layer after the completion of the battery. But, a rough thickness of the relevant layer may be possible to be measured in the presence of the positive electrode active material.

(Solid Electrolyte Layer)

The solid electrolyte layer is made of the same components as those that have been already described above and, hence, description of these materials is herein omitted.

With the present invention, though the polymer electrolyte is contained in any of the solid electrolyte layer, the positive electrode active material layer and the negative electrode active material layer, the respective layers may include the same polymer electrolyte and include different polymer electrolytes depending on the layers.

By the way, the polymer electrolyte, which is preferably used at the present day, includes polyether group polymer such as PEO and PPO. For this reason, this material has less oxidation resistance on a positive electrode side exposed to high temperatures. Therefore, when using positive electrode active material with high oxidation-reduction potential, it may be preferable for the negative electrode active material layer to have a lower capacity than that of the positive electrode active material layer placed in opposition to the negative electrode active material layer via the solid electrolyte layer. With the negative electrode active material layer selected to have less capacity than that of the positive electrode active material layer, an excessive increase in positive electrode potential can be stopped during a late stage in charging. Also, the capacities of the positive electrode active material layer and the negative electrode active material layer can be obtained from manufacturing conditions as theoretical capacities when manufacturing the positive electrode active material layer and the negative electrode active material layer. The capacities of these electrode layers of a completed product may be directly measured with a measuring device.

The thickness of the solid electrolyte layer is not particularly limited and for the purposes of obtaining a compact battery, the thickness of this layer is preferably decreased as small as possible within a range that can ensure a function as the solid electrolyte. With this view in mind, the solid electrolyte layer has a thickness of approximately 5 to 200 μm and, though such a range can be sufficiently utilized in the present invention, the thickness may preferably lie in a range of 5 to 50 μm. Here, this thickness corresponds to a value resulting from drying step prior to thermal pressing step. This is because the present invention allows the interfaces in the respective interlayers to be eliminated with a resultant difficulty in correctly measuring a thickness of the relevant layer after the completion of the battery. But, a rough thickness of the electrolyte layer may be possible to be obtained from the composite layer by measuring the positive electrode active material and the negative electrode active material.

(Insulation Layer)

The insulation layer is mainly used in the bipolar type battery. The component materials, the structure and the intended use of the insulation layer are already described above and, so, description of these is herein omitted.

(Electrode Terminal Plate) (Electrode Lead)

The positive electrode and negative electrode terminals plates, and the positive electrode and negative electrode leads may be used depending on needs.

The component materials, the structure and the intended use of the positive electrode and negative electrode terminals plates, and the positive electrode and negative electrode leads are already described above and, so, description of these is herein omitted.

(Battery Sheath Member (Battery Casing))

The component materials, the structure and the intended use of the battery sheath member (battery casing) are already described above and, so, description of these is herein omitted.

The solid electrolyte battery of the present invention can be used as a high capacity power supply for electric vehicles (EVs), hybrid electric vehicles (HEVs), fuel cell vehicles, hybrid fuel cell vehicles, and the like. In other words, the solid electrolyte battery of the present invention can be suitably used for the vehicle drive power supply or the auxiliary power supply requiring high energy density and high output density. In this case, it is desirable that a plurality of the lithium ion batteries of the present invention are connected to constitute an assembled battery. In other words, in the present invention, a plurality of the lithium-ion secondary batteries can be connected in parallel or in series into an assembled battery. Therefore, requirements for capacity and voltage in each type of vehicles can be achieved by a combination of base batteries. It is therefore possible to facilitate selection of necessary energy and output in designing. This eliminates the need for designing and producing batteries different for each type of vehicles, which can allow mass-production of the base batteries and reduce the costs by the mass-production. Hereinafter, a brief description is given of a typical embodiment of the assembled battery using the drawings.

FIGS. 9A to 9C show an assembled battery (42 V, 1 Ah) including twenty batteries connected in parallel, each battery having two bipolar batteries (24V, 50 mAh) of the present invention in series. In the parallel connection part, leads are connected to bus-bars 56, 58 of copper, and in the serial connection part, leads 48, 49 are connected to each other by vibration welding. End portions of each serial connection part are connected to terminals 62, 64 to form positive and negative terminals. On each side of each battery, a detection tab 60 for detecting voltage of each layer of the bipolar battery 41 is exposed, and detection lines 53 thereof are drawn out to front part of the assembled battery 51. To form the assembled battery 51 shown in FIGS. 9A to 9C, five bipolar batteries 41 are connected in parallel with the bus-bar 56, and the five bipolar batteries 41 connected in parallel are further connected to another five bipolar batteries 41 connected in parallel with the bus-bar 56 in series by connecting the electrode leads to each other. Four layers thereof are stacked, connected in parallel by the bus-bars 58, and then accommodated in an assembled battery casing. In this manner, connecting any pieces of the bipolar batteries 41 allows to provide the assembled battery 51 achieving desired current, voltage, and capacity. In the assembled battery 51, a positive terminal 62 and a negative terminal 64 are formed in the front part of a side face of the assembled battery casing 55, after connecting the batteries, the bus-bars 56 and the positive and negative terminals 62, 64 are connected to each other with terminal leads 59. In the assembled battery 51, a detection terminal 54 is provided in the side face of the assembled battery casing 55 to monitor the battery voltage (voltages of each unit cell and the bipolar battery). All the detection tabs 60 of the bipolar batteries 41 are connected to the detection terminal 54 through the detection lines 53. In the bottom portion of the assembled battery casing 55, elastic bodies 52 are provided. In the case where a plurality of the assembled batteries 51 are stacked to form a combined assembled battery, the elastic bodies 52 can keep the distance between the assembled batteries 51 to improve vibration absorption, shock-resistance, insulation, and heat radiation.

This assembled battery 51 may be provided with various types of measuring devices or controllers in addition to the aforementioned detection terminal 54 according to the use application. Furthermore, for connecting the leads 48, 49 of the bipolar batteries 41 to each other or connecting the detection tabs 60 and the detection lines 53, it is possible to use ultrasonic welding, hot welding, laser welding, or electron beam welding or use rivets or caulking. Moreover, to connect the bus-bars 56, 58 to the terminal leads 59 and the like, ultrasonic welding, hot welding, laser welding, and electron beam welding can be used.

For the elastic body 52, it is possible to use resin such as rubber, spring, or the like.

The assembled battery of the present invention may include the bipolar battery of the present invention and a battery group connected thereto in parallel. The battery group includes the same positive and negative electrode materials as the bipolar battery and has a same voltage as that of the bipolar battery by serially connecting not-bipolar batteries as many as the unit cells of the bipolar battery. In other words, for batteries forming an assembled battery, the bipolar batteries of the present invention and the non-bipolar batteries can be mixed. This allows the bipolar batteries, which are output-conscious, and the non-bipolar batteries, which are energy-conscious, to be combined to form an assembled battery and mutually offset weaknesses thereof. Accordingly, the weight and size of the assembled battery can be reduced. Which ratio of the bipolar batteries and non-bipolar batteries are mixed in is determined depending on safe performance and output performance required as the assembled battery.

FIGS. 10A to 10C show an assembled battery in which the bipolar battery 41 (42V, 50 mAh) and a battery group (42 V) are connected in parallel, the battery group including ten non-bipolar batteries 31 (4.2V, 1 Ah) connected in series. The battery group of the non-bipolar batteries 31 and the bipolar battery 41 have a same voltage to form a parallel connection in that state. This assembled battery 51A has a structure in which the bipolar battery 41 takes charge in the output while the battery group 31 of the non-bipolar batteries 31 takes charge in the energy. This is effective means for the assembled battery which is difficult to simultaneously achieve the required output and energy. Also in this assembled battery 51A, the copper bus-bars 56 are used for connection in the parallel connection parts and the parts connecting the batteries 31 adjacent in the horizontal direction in the drawing. The batteries 31 adjacent in the vertical direction in the drawing are connected by vibration welding of the leads 39 and 40. End portions of the parts connecting the non-bipolar batteries 31 and the bipolar battery 41 in parallel are connected to the terminals 62, 64 to form the positive and negative terminals. This assembled battery 51A is the same as the assembled battery 51 of FIGS. 9A to 9C except that the detection tabs 60 for detecting voltage of each layer of the bipolar battery 41 are exposed on both sides of the battery 41 and the detection lines thereof are drawn out to the front part of the assembled battery 51A. To form the assembled battery 51A shown in FIGS. 10A to 10C, ten pieces of the non-bipolar batteries 31 are vibration-welded with the bus-bars 56 serially from an end to be connected in series. Furthermore, the battery 41 and the serially connected batteries 31 at the both ends are connected in parallel with the bus-bars 56 and then accommodated in the assembled battery casing 55. Connecting the bipolar battery 41 in this manner allows to provide the assembled battery 51A capable of achieving desired current, voltage, and capacity. Also in the assembled battery 51A, the positive terminal 62 and the negative terminal 64 are formed in the front part of a side face of the casing 55, and the bus-bars 56 and the positive and negative terminals 62, 64 are connected to each other with the terminal leads 59. In the assembled battery 51A, the detection terminal 54 is provided in the side face of the casing 55 to monitor the battery voltages (voltages of each unit cell of the bipolar battery 41, the bipolar battery 41, and the non-bipolar battery 31). All the detection tabs 60 of the bipolar battery 41 are connected to the detection terminal 54 through the detection lines 53. In the bottom portion of the assembled battery casing 55, the elastic bodies 52 are attached. In the case where a plurality of the assembled batteries 51A are stacked to form a combined assembled battery, the elastic bodies 52 can keep the distance between the assembled batteries 51A to improve vibration absorption, shock-resistance, insulation, and heat radiation.

Moreover, the assembled battery of the present invention may have the following structure. The aforementioned bipolar batteries are connected in series and in parallel to form a first assembled battery unit, and secondary batteries which are not bipolar batteries are connected to form a second assembled battery unit having a same voltage as that of the first assembled battery unit. The first and second assembled battery units are connected in parallel into the assembled battery.

Next, when at least two of the aforementioned assembled batteries are connected in series, in parallel, or in a combination of series and parallel, requirements for the battery capacity and output for each intended use can be achieved at comparatively low costs without producing a new assembled battery. In other words, in the combined assembled battery of the present invention, first, base assembled batteries are fabricated, and these are combined into the assembled battery, which enables fabrication of a battery according to need. This eliminates the need for fabricating many types of the assembled batteries with different specifications, and the manufacturing costs can be reduced.

FIGS. 11A to 11C show a combined assembled battery (42 V, 6 Ah) in which six assembled batteries (42 V, 1 Ah) using the bipolar batteries shown in FIGS. 9A to 9C are connected in parallel. The assembled batteries constituting the combined assembled battery are integrated by joint plates and setscrews, and elastic bodies are provided between the assembled batteries to form a vibration-absorption structure. The terminals of the assembled batteries are connected with plate-shaped bus-bars. In other words, as shown in FIGS. 11A to 11C, to connect the aforementioned assembled batteries 51 into a combined assembled battery 70, the positive terminals 62 are electrically connected to each other with a positive-terminal coupling plate 72 including an outer positive-terminal portion, and the negative terminals 64 are connected to each other with a negative-terminal coupling plate 74 including an outer negative-terminal portion. On both side faces of each assembled battery casing 55, joint plates 76 are fixed with setscrews 77, thus connecting the assembled batteries 51. The positive and negative terminals 62 and 64 of each assembled batteries 51 are protected by positive and negative insulation covers, respectively, and are distinguished by color-coding with proper colors, for example, red and blue. In addition, the external elastic bodies 52 are set in the bottom portion of the assembled battery casing 55 to form a vibration-absorption structure.

In the aforementioned combined assembled battery, it is desirable for each of the plurality of assembled batteries constituting the combined assembled battery to be detachably connected. This is because, even when part of the batteries or the assembled batteries are broken, such a combined assembled battery can be repaired only by replacing the broken part.

A vehicle of the present invention is characterized by including the aforementioned assembled batteries and/or combined assembled batteries mounted thereon. By making the batteries lightweight and small, large space can remain within the vehicle. Moreover, miniaturization of the batteries allows the weight of the vehicle to be reduced.

Figure 12:
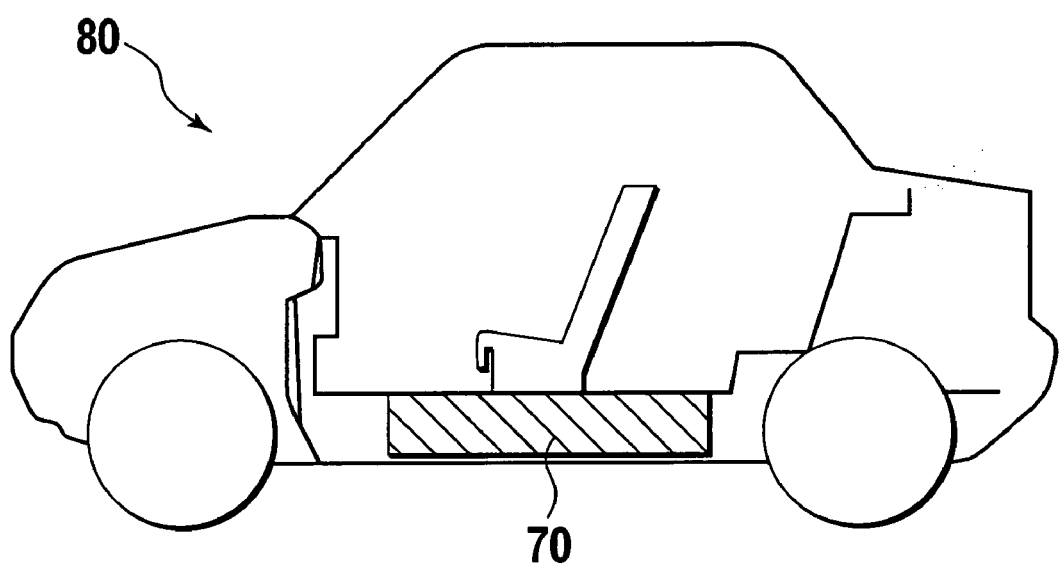
FIG. 12 is a schematic view showing a vehicle with the solid electrolyte battery of the present invention mounted thereon.
Figure 13:
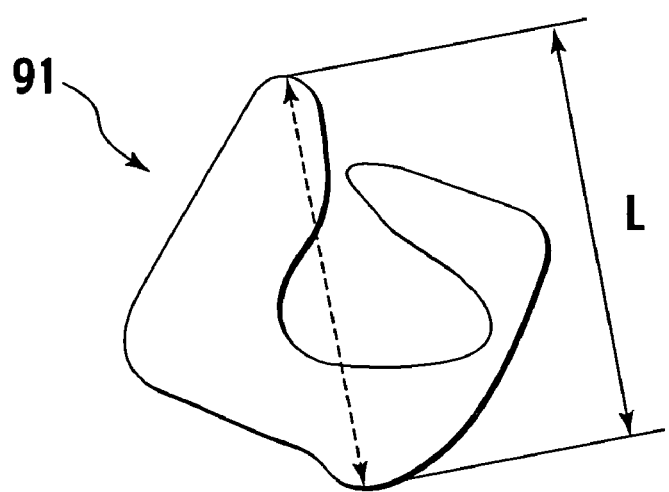
FIG. 13 is a view for illustrating an absolute maximum length to be used when measuring a grain size of particles.

As shown in FIG. 12, for being mounted on a vehicle 80, the combined assembled battery 70 is mounted under a seat in the center of the vehicle body. This is because the vehicle's internal space and a luggage room can be designed to be large when the battery 70 is mounted under the seat. A place where the battery is mounted is not limited to the place under the seat, but may be under the vehicle's floor, behind a seatback, a lower portion of the luggage room in the rear part, or an engine room in the front part of the vehicle.

In the present invention, not only the combined assembled battery, but also the assembled battery may be mounted on the vehicle depending on the use application, and a combination of these combined assembled battery and assembled battery may be mounted. Moreover, preferred vehicles on which the assembled battery and/or combined assembled battery of the present invention can be mounted as the drive power supply, auxiliary power supply, or the like, are electric vehicles, hybrid electric vehicles, fuel cell vehicles, hybrid fuel battery vehicles, or the like, but not limited to these.

Hereinafter, content of the present invention is described below with reference to Examples and Comparative Example.

EXAMPLE 1

(1) Preparation of Positive Electrode Ink (Step (1) of the First Embodiment)

A positive electrode active material containing 7 g of spinel manganese with a mean particle diameter of 1 μm, conductive material containing 2 g of carbon powder (Denka Black manufactured by DENKI KAGAKU KOGYO KABUSHIKI KAISYA) with a mean particle diameter of 30 nm, polymer electrolyte containing 4 g of polyethylene oxide with a molecular weight of approximately 2000, electrolyte salt containing 2 g of LiBETI and a solvent containing 20 g of acetonitrile were weighed and mixed using a mixer, thereby obtaining positive electrode ink. A viscosity of the resulting positive electrode ink was 5000 cP.

(2) Preparation of Negative Electrode Ink (Step (2) of the First Embodiment)

A negative electrode active material containing 9 g of graphite with a mean particle diameter of 1 μm, polymer electrolyte containing 4 g of polyethylene oxide with a molecular weight of approximately 2000, electrolyte salt containing 2 g of LiBETI and a solvent containing 20 g of acetonitrile were weighed and mixed to be homogeneous using a mixer, thereby obtaining negative electrode ink. A viscosity of the resulting negative electrode ink was 5000 cP.

(3) Preparation of Electrolyte Ink (Step (3) of the First Embodiment)

A polymer electrolyte containing 4 g of polyethylene oxide with a molecular weight of approximately 2000, electrolyte salt containing 2 g of LiBETI and a solvent containing 15 g of acetonitrile were weighed and mixed to be homogeneous, thereby obtaining electrolyte ink. A viscosity of the resulting electrolyte ink was 5000 cP.

(4) Coating (Steps (4) to (6) of the First Embodiment)

The positive electrode ink prepared as described above was coated on an aluminum foil with a thickness of 20 μm, forming a positive electrode collector, using a bar coater. A thickness of the resulting positive electrode active material layer was 28 μm.

The electrolyte ink prepared as described above was coated on a glass substrate using a bar coater. After coating, the glass substrate was dried in a vacuum oven for one hour, thereby preparing an electrolyte layer. A thickness of the resulting electrolyte layer was 45 μm. Also, after drying, the electrolyte layer was peeled off from the glass substrate and stamped in a shape with a diameter of Φ16 mm.

The negative electrode ink prepared as described above was coated on a copper foil with a thickness of 20 μm using a bar coater. After coating, the negative electrode active material layer was dried in the vacuum oven for one hour, thereby preparing a negative electrode (collector plus negative electrode active material layer). A thickness of the resulting negative electrode active material layer was 16 μm.

(5) Thermal Pressing and Preparation of Cell (Steps after Step (7) of the First Embodiment)

The positive electrode and the negative electrode, prepared as described above, were stamped in shapes with diameters of Φ14 mm and Φ15 mm, respectively. Further, the positive electrode and the negative electrode were sandwiched between the electrolyte layers, prepared as described above, thereby forming a composite body including the positive electrode ink layer, the electrolyte ink layer and the negative electrode ink layer upon which the composite body was thermally pressed for five seconds at a temperature of 80° C. using a roll press. Using the composite body resulting from thermal pressing, a coin cell was prepared. A total thickness of the composite layer before thermal pressing was 89 μm and a total thickness of the composite layer after thermal pressing was 45 μm. Also, upon observation of the composite layer after thermal pressing using SEM, it was found that no interfaces appeared in the interlayers with the respective layers being integrated. Besides, it was observed that particles were integrated.

Upon charging and discharging the resulting coin cell at rates of 0.1 C and 0.5 C, respectively, a charging capacity at the rate of 0.1 C was 79% of a theoretical capacity and a charging capacity at the rate of 0.5 C was 41% of the theoretical capacity. This result is summarized in Table 1.

Comparative Example 1

(1) Preparation of Positive Electrode Ink

A positive electrode active material containing 7 g of spinel manganese with a mean particle diameter of 1 μm, conductive material containing 2 g of Denka Black with a mean particle diameter of 30 nm, polymer electrolyte containing 4 g of polyethylene oxide with a molecular weight of approximately 2000, electrolyte salt containing 2 g of LiBETI and a solvent containing 20 g of acetonitrile were weighed and mixed using a mixer, thereby preparing positive electrode ink. A viscosity of the resulting positive electrode ink was 5000 cP.

(2) Preparation of Negative Electrode Ink

A negative electrode active material containing 9 g of graphite with a mean particle diameter of 1 μm, polymer electrolyte containing 4 g of polyethylene oxide with a molecular weight of approximately 2000, electrolyte salt containing 2 g of LiBETI and a solvent containing 20 g of acetonitrile were weighed and mixed to be homogeneous using a mixer, thereby preparing negative electrode ink. A viscosity of the resulting negative electrode ink was 5000 cP.

(3) Preparation of Electrolyte Ink

A polymer electrolyte containing 4 g of polyethylene oxide with a molecular weight of approximately 2000, electrolyte salt containing 2 g of LiBETI and a solvent containing 15 g of acetonitrile were weighed and mixed to be homogeneous, thereby preparing electrolyte ink. A viscosity of the resulting electrolyte ink was 5000 cP.

(4) Coating

The positive electrode ink prepared as described above was coated on an aluminum foil with a thickness of 20 μm, forming a positive electrode collector, using a bar coater. After coating, the aluminum foil was dried in the vacuum oven for one hour, thereby preparing a positive electrode (positive electrode collector plus positive electrode active material layer). A thickness of the resulting positive electrode active material layer was 28 μm.

The electrolyte ink prepared as described above was coated on a glass substrate using the bar coater. After coating, the glass substrate was dried in the vacuum oven for one hour, thereby preparing an electrolyte layer. A thickness of the resulting electrolyte layer was 45 μm. Also, after drying, the electrolyte layer was peeled off from the glass substrate and stamped in a shape with a diameter of Φ16 mm.

The negative electrode ink prepared as described above was coated on a copper foil, forming a negative electrode collector, using the bar coater. After coating, the negative electrode ink was dried in the vacuum oven for one hour, thereby preparing a negative electrode (collector plus negative electrode active material layer). A thickness of the resulting negative electrode active material layer was 16 μm.

(5) Preparation of Cell

The positive electrode and the negative electrode, prepared as described above, were stamped in shapes with diameters of Φ14 mm and Φ15 mm, respectively, and sandwiched between the electrolyte layers, prepared as described above, thereby forming a coin cell.

Upon charging and discharging the resulting coin cell at rates of 0.1 C and 0.5 C, respectively, a charging capacity at the rate of 0.1 C was 35% of a theoretical capacity and a charging capacity at the rate of 0.5 C was 16% of the theoretical capacity. This result is summarized in Table 1.

EXAMPLE 2

(1) Preparation of Positive Electrode Ink (Steps (1)+(3) of the Second Embodiment)

A positive electrode active material containing 7 g of spinel manganese with a mean particle diameter of 1 μm, conductive material containing 2 g of Denka Black with a mean particle diameter of 30 nm, polymer electrolyte containing 4 g of polyethylene oxide with a molecular weight of approximately 2000, electrolyte salt containing 2 g of LiBETI and a solvent containing 85 g of acetonitrile were weighed and mixed using a mixer, thereby preparing a mixture slurry. A viscosity of the resulting mixture slurry was 100 cP.

The mixture slurry prepared as described above was granulated into particles with a mean diameter of 10 μm using a spray drier. The prepared positive electrode polymer particles were dispersed in carbon tetrachloride, thereby preparing positive electrode ink. A viscosity of the resulting positive electrode particle ink was 5000 cP.

(2) Preparation of Negative Electrode Ink (Steps (2)+(4) of the Second Embodiment)

A negative electrode active material containing 9 g of graphite with a mean particle diameter of 1 μm, polymer electrolyte containing 4 g of polyethylene oxide with a molecular weight of approximately 2000, electrolyte salt containing 2 g of LiBETI and a solvent containing 85 g of acetonitrile were weighed and mixed to be homogeneous using a mixer, thereby obtaining a mixture slurry. A viscosity of the resulting mixture slurry was 100 cP.

The mixture slurry prepared as described above was granulated into particles with a mean diameter of 10 μm using the spray drier. The prepared negative electrode polymer particles were dispersed in carbon tetrachloride, thereby preparing negative electrode ink. A viscosity of the resulting negative electrode particle ink was 5000 cP.

(3) Preparation of Electrolyte particle Ink (Step (5) of the Second Embodiment)

A polymer electrolyte containing 4 g of polyethylene oxide with a molecular weight of approximately 2000, electrolyte salt containing 2 g of LiBETI and a solvent containing 50 g of acetonitrile were weighed and mixed to be homogeneous, thereby obtaining a mixture slurry. A viscosity of the resulting mixture slurry was 100 cP.

The mixture slurry prepared as described above was granulated into particles with a mean diameter of 10 μm using the spray drier. The prepared electrolyte particles were dispersed in carbon tetrachloride, thereby preparing electrolyte particle ink. A viscosity of the resulting electrolyte particle ink was 5000 cP.

(4) Coating (Steps (6) to (8) of the Second Embodiment)

The positive electrode particle ink, prepared as described above, was coated on an aluminum foil with a thickness of 20 μm using the bar coater. After coating, the positive electrode particle ink was dried in a vacuum oven for one hour, thereby forming a positive electrode active material layer. A thickness of the resulting positive electrode active material layer was 44 μm.

After the positive electrode particle ink was coated, the electrolyte particle ink was coated in an area, which runs off edges of the area coated with the positive electrode particle ink, and dried under the same condition, thereby forming an electrolyte layer. A thickness of the resulting electrolyte layer was 65 μm.

Further, the negative electrode particle ink was coated in an area, which runs off edges of an area coated with the positive electrode particle ink but does not run off edges of an area coated with the electrolyte particle ink, and dried under the same condition, thereby forming a negative electrode active material layer. A thickness of the resulting negative electrode active material layer was 23 μm.

(5) Thermal Pressing (Step (9) of the Second Embodiment)

A composite body, comprised of the above-described positive electrode and negative electrode collectors, the positive electrode active material layer, the electrolyte layer and the negative electrode active material layer, was thermally pressed for five seconds at a temperature of 80° C. using a roll press. A total thickness of the composite layer before thermal pressing was 132μm and a total thickness of the composite layer after thermal pressing was 103μm. Also, upon observation of the composite layer after thermal pressing using SEM, it was found that no interface layers appeared in the interlayers with the respective layers being integrated. Besides, it was observed that the particles were integrated.

(6) Preparation of Cell

The composite body, prepared as described above, was stamped in shape with a diameter of Φ16 mm, thereby forming a coin cell.

Upon charging and discharging the resulting coin cell at rates of 0.1 C and 0.5 C, respectively, a charging capacity at the rate of 0.1 C was 83% of a theoretical capacity and a charging capacity at the rate of 0.5 C was 64% of the theoretical capacity. This result is summarized in Table 1.

TABLE 1

|  | 0.1 C | 0.5 C |
|---|---|---|
| Example 1 | 79% | 41% |
| Example 2 | 83% | 64% |
| Comparative Example 1 | 35% | 16% |

Numeric values of the above Table 1 represent the ratio (%) of a discharging capacity to a theoretical capacity.

From the above Table 1, it was confirmed that the batteries of Examples 1 and 2, wherein thermal pressing was executed to eliminate interfaces, had more remarkably improved load characteristics than those of the battery of the Comparative Example 1 with no occurrence of thermal pressing.

Further, the battery of Example 2, wherein the ink materials of the electrodes and the electrolyte were grained into particles, exhibited further highly improved load characteristics than those of the battery of Example 1 wherein no graining of the ink materials of the electrodes and the electrolyte was executed. This is because it is conceived, as previously noted above, that the particles are brought into contact with one another and, hence, the presence of the particles has a further effect to eliminate the interfaces than that achieved by the plane surface when applied with thermal pressing.

The entire content of a Japanese Patent Application No. P2003-425013 with a filing date of Dec. 22, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A method of manufacturing a solid electrolyte battery having an electric power-generating element composed of a positive electrode, a solid electrolyte layer and a negative electrode that are stacked, the method comprising:
   thermally pressing a composite layer including a positive electrode particle ink layer, an electrolyte ink layer and a negative electrode particle ink layer that are formed by coating a positive electrode particle ink, an electrolyte ink, and a negative electrode particle ink, wherein the positive electrode particle ink includes a positive electrode polymer particle containing a first polymer electrolyte, the electrolyte ink includes a second polymer electrolyte, and the negative electrode particle ink includes a negative electrode polymer particle containing a third polymer electrolyte, wherein, by thermally pressing the composite layer the first to third polymer electrolytes are integrated and wherein the positive electrode polymer particle and the negative electrode polymer particle have no trace of their original particle forms, thereby eliminating interfaces between the positive electrode particle ink layer and the electrolyte ink layer and between the electrolyte ink layer and the negative electrode particle ink layer.

2. A method of manufacturing a solid electrolyte battery according to claim 1, further comprising:

preparing the positive electrode polymer particle containing the first polymer electrolyte, a conductive material and a positive electrode active material;

preparing the negative electrode polymer particle containing the third polymer electrolyte and a negative electrode active material;

dispersing the positive electrode polymer particle in a solvent to form the positive electrode particle ink;

dispersing the negative electrode polymer particle in the solvent to form the negative electrode particle ink;

preparing the electrolyte ink containing the second polymer electrolyte and the solvent;

coating one of the positive electrode particle ink and the negative electrode particle ink on a collector;

coating the electrolyte particle ink on the positive electrode particle ink layer or the negative electrode particle ink layer formed by the coating; and coating the other one of the positive electrode particle ink and the negative electrode particle ink on the electrolyte ink layer formed by the coating.

3. A method of manufacturing a solid electrolyte battery according to claim 1, wherein the electrolyte ink includes an electrolyte particle ink in which the second polymer electrolyte is grained into a solid particle that is dispersed in a solvent.

4. A method of manufacturing a solid electrolyte battery according to claim 1, wherein the first to third polymer electrolytes are formed by thermally polymerizing a raw material polymer.

5. A solid electrolyte battery manufactured according to the method of claim 1.

6. An assembled battery, comprising:

a plurality of solid electrolyte batteries, each of the solid electrolyte batteries being a battery according to claim 5, wherein a plurality of the solid electrolyte batteries are connected and installed in series or in parallel.

7. A combined assembled battery, comprising:

a plurality of assembled batteries, each of the assembled batteries being a battery according to claim 6.

8. A combined assembled battery according to claim 7, wherein each of the assembled batteries is independently detachable.

9. A vehicle, comprising:

a combined assembled battery according to claim 7.

10. A method of manufacturing a solid electrolyte battery according to claim 3, wherein the positive electrode polymer particle, the negative electrode polymer particle and the solid particle of the second polymer electrolyte have no trace of their original particle forms, thereby eliminating interfaces between the positive electrode particle ink layer and the electrolyte ink layer and between the electrolyte ink layer and the negative electrode particle ink layer.

* * * * *